(12) United States Patent
Yamaga et al.

(10) Patent No.: US 11,100,945 B2
(45) Date of Patent: Aug. 24, 2021

(54) SERVO PATTERN RECORDING METHOD, SERVO PATTERN RECORDING APPARATUS, MANUFACTURING METHOD FOR A TAPE-LIKE MAGNETIC RECORDING MEDIUM, AND TAPELIKE MAGNETIC RECORDING MEDIUM

(71) Applicant: Sony Corporation, Tokyo (JP)

(72) Inventors: Minoru Yamaga, Miyagi (JP); Hiroshi Morita, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/958,517

(22) PCT Filed: Oct. 29, 2019

(86) PCT No.: PCT/JP2019/042288
§ 371 (c)(1),
(2) Date: Jun. 26, 2020

(87) PCT Pub. No.: WO2020/090785
PCT Pub. Date: May 7, 2020

(65) Prior Publication Data
US 2021/0056986 A1  Feb. 25, 2021

(30) Foreign Application Priority Data

Oct. 29, 2018 (JP) .............................. JP2018-203039
Oct. 8, 2019 (JP) .............................. JP2019-185151

(51) Int. Cl.
G11B 5/09      (2006.01)
G11B 5/008     (2006.01)
G11B 15/675    (2006.01)

(52) U.S. Cl.
CPC .... *G11B 5/00813* (2013.01); *G11B 15/67505* (2013.01)

(58) Field of Classification Search
None
See application file for complete search history.

(56) References Cited

U.S. PATENT DOCUMENTS

| 7,130,140 | B1 | 10/2006 | Boyer et al. | |
| 2004/0207943 | A1* | 10/2004 | Nakao | G11B 27/322 |
| | | | | 360/48 |

(Continued)

FOREIGN PATENT DOCUMENTS

| EP | 1528540 A1 | 5/2005 |
| JP | 2004-318983 A | 11/2004 |
| JP | 2011-523487 A | 8/2011 |

OTHER PUBLICATIONS

International Search Report issued in connection with PCT/JP2019/042288, dated Dec. 3, 2019. (2 pages).

*Primary Examiner* — Peter Vincent Agustin
(74) *Attorney, Agent, or Firm* — K&L Gates LLP

(57) ABSTRACT

A servo pattern recording method according to an embodiment of the present technology is a servo pattern recording method of recording a servo pattern on a tape-like magnetic recording medium including a magnetic layer including five or more servo bands, the method including: determining at least three first servo bands in which first servo band identification information constituted by a plurality of bits is to be recorded, and at least two second servo bands in which second servo band identification information constituted by a plurality of bits is to be recorded, the second servo band identification being different from the first servo band identification information; and recording each of the first servo band identification information and the second servo band identification information in the first servo band and the second servo band on the same phase.

23 Claims, 10 Drawing Sheets

(56) References Cited

U.S. PATENT DOCUMENTS

| | | | | |
|---|---|---|---|---|
| 2005/0030662 | A1* | 2/2005 | Bui | G11B 5/584 |
| | | | | 360/48 |
| 2005/0057839 | A1* | 3/2005 | Ohtsu | G11B 5/584 |
| | | | | 360/48 |
| 2005/0099715 | A1* | 5/2005 | Yip | G11B 5/584 |
| | | | | 360/48 |
| 2005/0153062 | A1* | 7/2005 | Naoe | G11B 5/7085 |
| | | | | 427/127 |
| 2005/0264935 | A1* | 12/2005 | Sueki | G11B 5/70 |
| | | | | 360/134 |
| 2009/0287982 | A1* | 11/2009 | Kabelac | G11B 27/36 |
| | | | | 714/771 |
| 2011/0013312 | A1* | 1/2011 | Bui | G11B 5/5552 |
| | | | | 360/77.05 |
| 2019/0259416 | A1* | 8/2019 | Kawakami | G11B 5/70 |
| 2019/0348067 | A1* | 11/2019 | Goker | G11B 5/00813 |

* cited by examiner

SERVO PATTERN RECORDING METHOD, SERVO PATTERN RECORDING APPARATUS, MANUFACTURING METHOD FOR A TAPE-LIKE MAGNETIC RECORDING MEDIUM, AND TAPELIKE MAGNETIC RECORDING MEDIUM

TECHNICAL FIELD

The present technology relates to a servo pattern recording method for writing a servo pattern in a magnetic layer, a servo pattern recording apparatus, a tape-like magnetic recording medium having a magnetic layer in which a servo pattern is recorded, and a manufacturing method therefor.

BACKGROUND ART

In recent years, magnetic recording media have been widely used for back-up of electronic data and the like. One of the magnetic recording media is, for example, a magnetic tape cartridge. The magnetic tape cartridge has attracted more and more attention as a medium for storing big data or the like owing to its large capacity and long-term memory.

For example, a plurality of data bands parallel to a tape longitudinal direction is provided in a magnetic layer of a magnetic tape according to the linear tape open (LTO) standard. Data is recorded in a plurality of recording tracks inside those data bands. Moreover, a plurality of servo bands parallel to the tape longitudinal direction is provided in the magnetic tape. Each data band is arranged in the magnetic layer so as to be sandwiched between the plurality of servo bands. A servo pattern in a predetermined shape is recorded in each servo band. The servo pattern performs positioning (tracking) control of a recording/reproducing head with respect to each recording track. In addition, tape information and servo band identification information for identifying the data band has been embedded in the servo pattern.

In a timing-based servo type drive system employed for the LTO standard, a servo technology that identifies a head position by using non-parallel servo patterns and a time variable or distance variable is used. The non-parallel servo patterns typically include two different azimuthal slopes arranged in the tape longitudinal direction. This type of drive system generates a position error signal (PES) by reading the servo pattern and suitably positions the drive head with respect to the recording track.

In addition, Patent Literature 1 has disclosed a technology that deviates the record position of the servo pattern in a tape travel direction between the servo bands, for example, as a technology that identifies an arbitrary data band from the plurality of data bands. In accordance with this technology, a phase of a reproduction waveform of the servo pattern, which is obtained by reading the servo pattern, differs between the respective servo bands. Therefore, the position of the data band at which recording/reproducing is to be performed can be identified by acquiring the phase difference of the reproduction waveform between two adjacent servo bands from the PES.

CITATION LIST

Patent Literature

Patent Literature 1: Japanese Unexamined Patent Application Publication No. 2011-523487

DISCLOSURE OF INVENTION

Technical Problem

However, PESs also have a phase difference, and there is thus a problem that an error of precision enhancement due to PES averaging and an error of azimuth adjustment of the drive head occur. In particular, if the number of data bands is further increased due to the demand for high-density recording of the magnetic tape in recent years, the number of servo bands also increases. Therefore, providing numerous phase differences of the reproduction waveform between the servo bands along with that makes it difficult to stably detect the servo band position.

In view of the above-mentioned circumstances, it is an object of the present technology to provide a servo pattern recording method, a servo pattern recording apparatus, a manufacturing method for a tape-like magnetic recording medium, and a tape-like magnetic recording medium, which can easily cope with an increase in data band.

Solution to Problem

A servo pattern recording method according to an embodiment of the present technology is a servo pattern recording method of recording a servo pattern on a tape-like magnetic recording medium including a magnetic layer including five or more servo bands, the method including:
  determining
    at least three first servo bands in which first servo band identification information constituted by a plurality of bits is to be recorded, and
    at least two second servo bands in which second servo band identification information constituted by a plurality of bits is to be recorded, the second servo band identification being different from the first servo band identification information; and
  recording each of the first servo band identification information and the second servo band identification information in the first servo band and the second servo band on the same phase.

In the servo pattern recording method, the first servo band and the second servo band may be determined such that a combination of the first servo band identification information and the second servo band identification information is not duplex between two adjacent servo bands.

The servo pattern recording method may further include determining a third servo band in which third servo band identification information constituted by a plurality of bits is to be recorded, the third servo band identification information being different from the first servo band identification information and the second servo band identification information.

The first servo band identification information may include a plurality of servo frames that includes two or more different types of azimuthal slopes and encodes the first servo band identification information and the second servo band identification information may include a plurality of servo frames that includes two or more different types of azimuthal slopes and encodes the second servo band identification information. In this case, as the plurality of servo frames that encodes the first servo band identification information and the servo frames that encode the second servo band identification information are compared to each other, some of arrangement intervals of at least one azimuthal slopes are different from each other.

A servo pattern recording apparatus according to an embodiment of the present technology is a servo pattern recording apparatus that records a servo pattern on a tape-like magnetic recording medium including a magnetic layer including five or more servo bands, the apparatus including a servo write head and a drive unit.

The servo write head including a plurality of recording portions arranged corresponding to the servo bands.

The drive unit that outputs a first recording signal for recording the first servo band identification information with respect to a first recording portion corresponding to at least three first servo bands in which first servo band identification information constituted by a plurality of bits is to be recorded, and outputs a second recording signal for recording the second servo band identification information on the same phase as the first servo band identification information with respect to the second recording portion corresponding to at least two second servo bands in which second servo band identification information constituted by a plurality of bits is to be recorded, the second servo band identification being different from the first servo band identification information.

The servo write head may be configured to record the first servo band identification information and the second servo band identification information in the servo bands such that a combination of the first servo band identification information and the second servo band identification information is not duplex between two adjacent servo bands.

The plurality of recording portions may respectively include magnetic gaps in which a plurality of servo frames that includes two or more different types of azimuthal slopes in the servo bands and encodes the first servo band identification information and the second servo band identification information is capable of being recorded as each of the first servo band identification information and the second servo band identification information. In this case, the drive unit outputs the first recording signal and the second recording signal at pulse rise times different from each other in accordance with a difference between the first servo band identification information and the second servo band identification information.

A manufacturing method for a tape-like magnetic recording medium according to an embodiment of the present technology is a manufacturing method for a tape-like magnetic recording medium including a magnetic layer including five or more servo bands, the method including:

determining
at least three first servo bands in which first servo band identification information constituted by a plurality of bits is to be recorded, and
at least two second servo bands in which second servo band identification information constituted by a plurality of bits is to be recorded, the second servo band identification being different from the first identification information; and recording each of the first servo band identification information and the second servo band identification information on the same phase in the first servo band and the second servo band.

A tape-like magnetic recording medium according to an embodiment of the present technology includes a magnetic layer including five or more servo bands, in which the servo bands include at least three first servo bands in which first servo band identification information constituted by a plurality of bits is recorded, and at least two second servo bands in which second servo band identification information constituted by a plurality of bits is recorded, the second servo band identification information being different from the first identification information.

The first servo band identification information and the second servo band identification information may be recorded on the same phase.

The first servo band identification information and the second servo band identification information may be recorded in the servo bands such that a combination of the first servo band identification information and the second servo band identification information is not duplex between two adjacent servo bands.

The first servo band identification information may include a plurality of servo frames that includes two or more different types of azimuthal slopes and encodes the first servo band identification information and the second servo band identification information may include a plurality of servo frames that includes two or more different types of azimuthal slopes and encodes the second servo band identification information. In this case, as the plurality of servo frames that encodes the first servo band identification information and the servo frames that encode the second servo band identification information are compared to each other, some of arrangement intervals of at least one azimuthal slopes are different from each other.

The servo bands may further include a third servo band in which third servo band identification information constituted by a plurality of bits is recorded, the third servo band identification information being different from the first servo band identification information and the second servo band identification information.

MODE(S) FOR CARRYING OUT THE INVENTION

Hereinafter, embodiments according to the present technology will be described with reference to the drawings.

Figure 1:
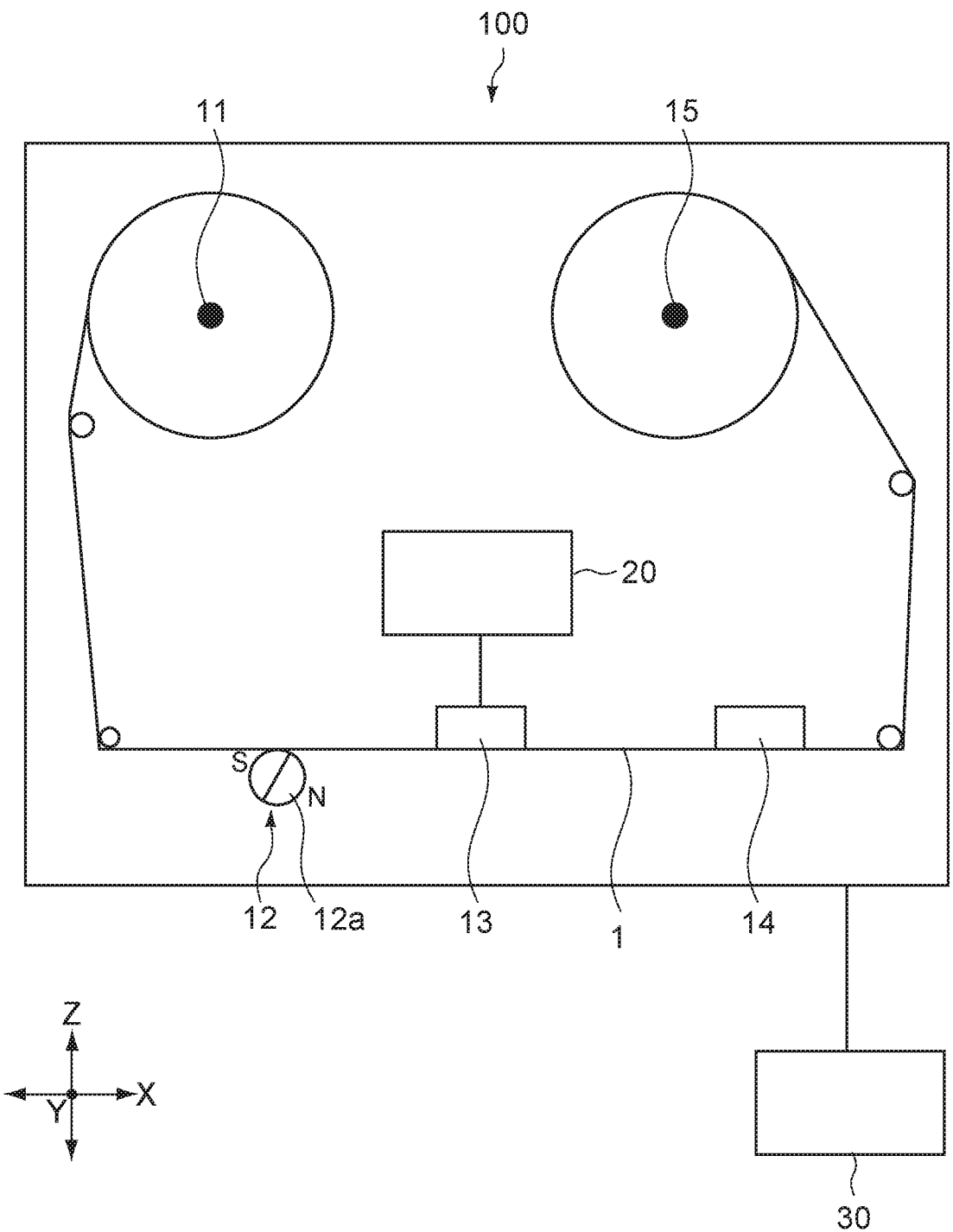
FIG. 1. A front view showing a servo pattern recording apparatus according to an embodiment of the present technology.
Figure 2:
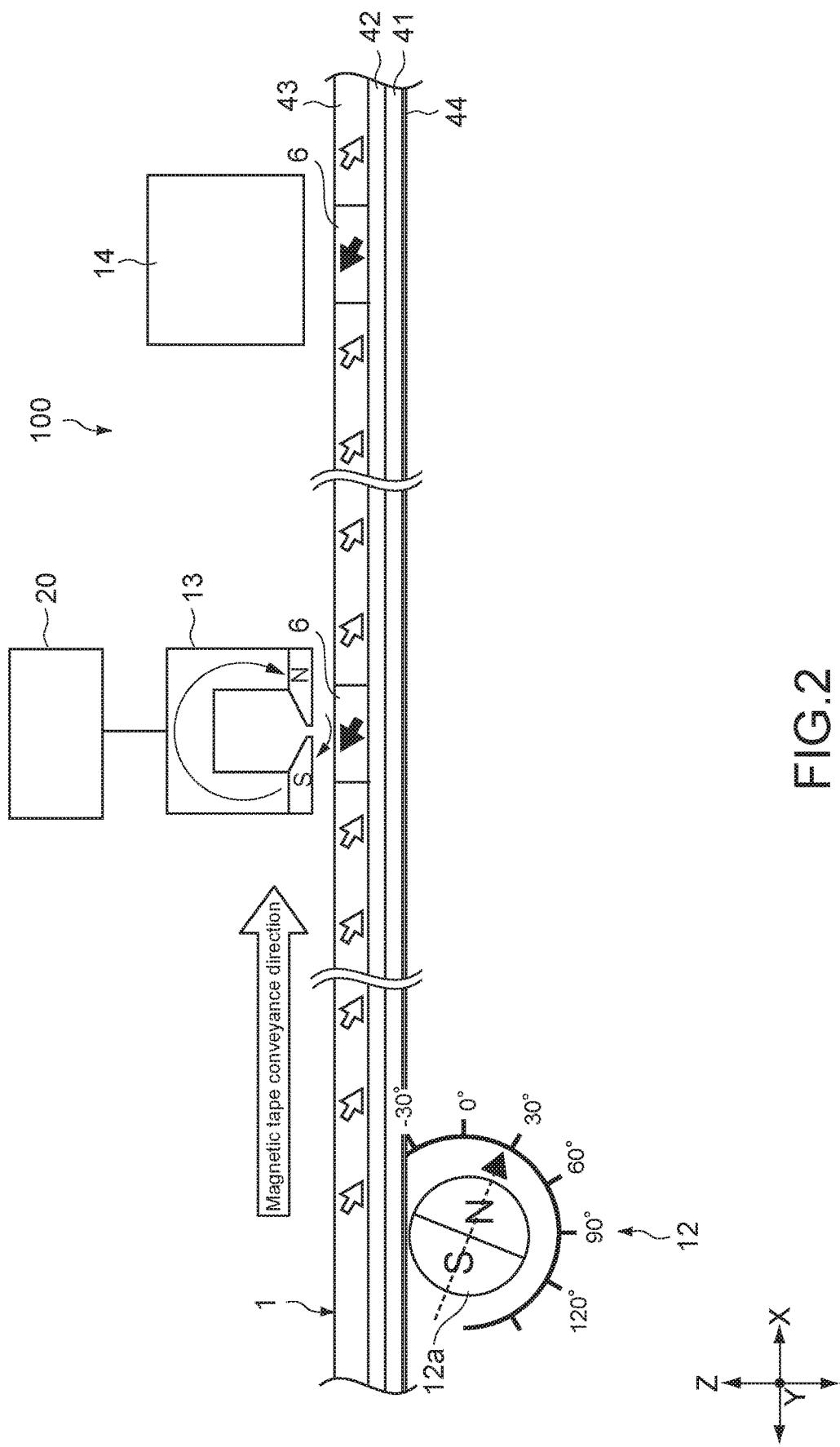
FIG. 2. A partial and enlarged diagram showing a part of the servo pattern recording apparatus.
Figure 3:
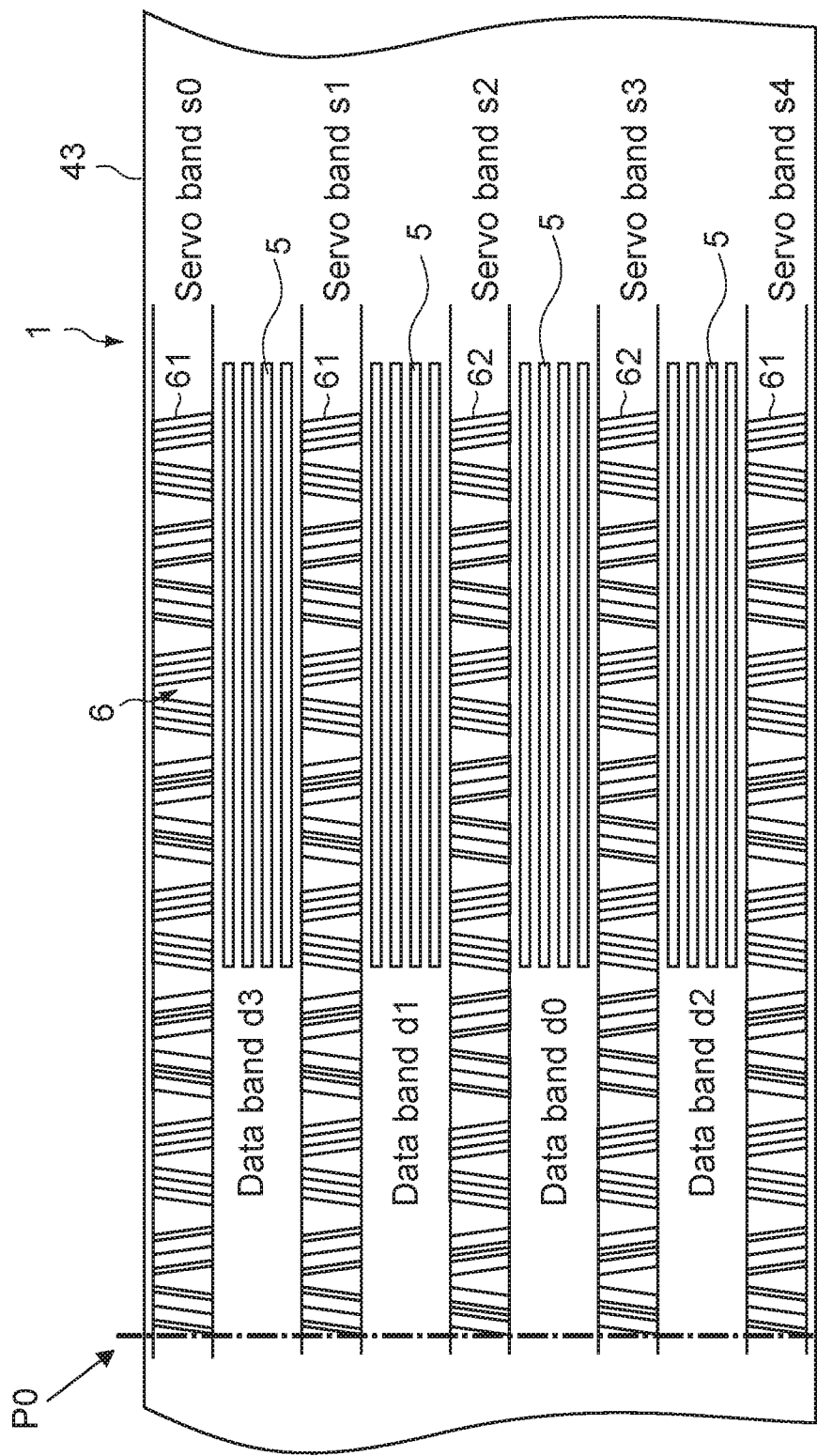
FIG. 3. A top view of a magnetic tape showing servo band identification information that constitutes a part of the servo pattern.

FIG. 1 is a front view showing a servo pattern recording apparatus 100 according to an embodiment of the present technology. FIG. 2 is a partial and enlarged diagram showing a part of the servo pattern recording apparatus 100. FIG. 3 is a top view showing a magnetic tape 1 on which a servo pattern 6 is recorded.

[Configuration of Magnetic Tape]

First of all, a configuration of the magnetic tape 1 will be described with reference to FIG. 2. The magnetic tape 1 is a tape-like magnetic recording medium. The magnetic tape 1 includes a long base material (base) 41, an underlayer 42 provided on one main surface (first main surface) of the base material 41, a magnetic layer 43 provided on the underlayer 42, and a back layer 44 provided on the other main surface (second main surface) of the base material 41. It should be noted that the underlayer 42 and the back layer 44 may be provided in a manner that depends on needs and may be omitted. The magnetic tape 1 may be a magnetic recording medium of a perpendicular recording type or may be a magnetic recording medium of a longitudinal recording type.

The magnetic tape 1 has a long tape shape. The magnetic tape 1 is made to travel in a longitudinal direction in recording/reproducing. It should be noted that the surface of the magnetic layer 43 is a surface on which a magnetic head provided in a recording/reproducing apparatus (not shown) is made to travel. The magnetic tape 1 is favorably used in a recording/reproducing apparatus provided with a ring type head as a recording head. The magnetic tape 1 is favorably used in a recording/reproducing apparatus configured to be capable of recording data with a data track width of 1500 nm or less or 1000 nm or less.

(Base Material)

The base material 41 is a non-magnetic support that supports the underlayer 42 and the magnetic layer 43. The base material 41 has a long film shape. The upper limit value of the average thickness of the base material 41 is favorably 4.2 μm or less, more favorably 3.8 μm or less, much more favorably 3.4 μm or less. In a case where the upper limit value of the average thickness of the base material 41 is 4.2 μm or less, the recording capability of a single data cartridge can be made larger than that of a general magnetic tape. The lower limit value of the average thickness of the base material 41 is favorably 3 μm or more, more favorably 3.2 μm or more. In a case where the lower limit value of the average thickness of the base material 41 is 3 μm or more, lowering of the strength of the base material 41 can be suppressed.

The average thickness of the base material 41 is determined in the following manner. First of all, the magnetic tape 1 having a width of ½ inch is prepared, it is cut to have a length of 250 mm, and a sample is fabricated. Subsequently, the layers (i.e., the underlayer 42, the magnetic layer 43, and the back layer 44) of the sample other than the base material 41 are removed with a solvent such as methyl ethyl ketone (MEK) and dilute hydrochloric acid. Next, the Laser Hologage (LGH-110C) manufactured by Mitutoyo Corporation is used as the measurement apparatus to measure the thickness of the sample (the base material 41) at five or more positions and simply average (arithmetically average) those measurement values for calculating the average thickness of the base material 41. Note that it is assumed that the measurement positions are randomly selected from the sample.

The base material 41 includes polyester. Since the base material 41 includes polyester, the Young's modulus of the base material 41 in the longitudinal direction can be reduced. Therefore, the width of the magnetic tape 1 can be kept constant or substantially constant by adjusting the tension of the magnetic tape 1 in the longitudinal direction during travel through the recording/reproducing apparatus.

The polyester includes at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bis phenoxycarboxylate, for example. In a case where the base material 41 includes two or more polyesters, those two or more polyesters may be mixed, may be copolymerized, or may be stacked. At least one of a terminus or a side chain of the polyester may be modified.

The fact that the base material 41 includes the polyester is confirmed in the following manner, for example. First of all, the layers of the sample other than the base material 41 are removed as in the measurement method for the average thickness of the base material 41. Next, the IR spectrum of the sample (the base material 41) is acquired using the infrared absorption spectrometry (IR). Based on this IR spectrum, it can be confirmed that the base material 41 includes the polyester.

The base material 41 may further include at least one of polyamide, polyimide, or polyamide imide, for example, other than the polyester and may further include at least one of polyamide, polyimide, polyamide imide, polyolefin, a cellulose derivative, vinyl resin, or another polymer resin. The polyamide may be aromatic polyamide (aramid). The polyimide may be aromatic polyimide. The polyamide imide may be aromatic polyamide imide.

In a case where the base material 41 includes polymer resins other than the polyester, the base material 41 favorably contains the polyester as a main component. Here, the main component means a component at the largest content (mass ratio) among the polymer resins contained in the base material 41. In a case where the base material 41 includes polymer resins other than the polyester, the polyester and polymer resins other than the polyester may be mixed or may be copolymerized.

The base material 41 may be biaxially stretched in the longitudinal direction and the width direction. The polymer resin included in the base material 41 is favorably oriented obliquely to the width direction of the base material 41.

(Magnetic Layer)

The magnetic layer 43 is a record layer for recording a signal with a magnetization pattern. The magnetic layer 43 may be a record layer of a perpendicular recording type or may be a record layer of a longitudinal recording type. The magnetic layer 43 includes magnetic powder, a binder, and a lubricant, for example. The magnetic layer 43 may further include at least one additive of an antistatic agent, an abrasive, a curing agent, a corrosion inhibitor, a non-magnetic reinforcing particle, or the like in a manner that depends on needs.

Arithmetic average roughness Ra of the surface of the magnetic layer 43 is 2.5 nm or less, favorably 2.2 nm or less, more favorably 1.9 nm or less. In a case where the arithmetic average roughness Ra is 2.5 nm or less, lowering of the output due to spacing loss can be suppressed, and thus excellent electromagnetic conversion characteristics can be obtained. The lower limit value of the arithmetic average roughness Ra of the surface of the magnetic layer 43 is favorably 1.0 nm or more, more favorably 1.2 nm or more, much more favorably 1.4 nm or more. In a case where the lower limit value of the arithmetic average roughness Ra of the surface of the magnetic layer 43 is 1.0 nm or more, deterioration of the traveling property due to an increase in friction can be suppressed.

The arithmetic average roughness Ra is determined in the following manner. First of all, the surface of the magnetic layer 43 is observed by an atomic force microscope (AFM) and an AFM image of 40 μm×40 μm is obtained. Nano Scope IIIa D3100 manufactured by Digital Instruments is used as the AFM. One made of silicon monocrystalline is used as a cantilever (Note 1). Measurement is conducted by tuning at 200 to 400 Hz as the tapping frequency. Next, the AFM image is divided into 512×512 (=262, 144) measurement points. The height $Z(i)$ (i: measurement point numbers, i=1 to 262, 144) is measured at each measurement point. The measured heights $Z(i)$ at the respective measurement points are simply averaged (arithmetically averaged) to determine an average height (average surface) Zave $(=(Z(1)+Z(2)+ \ldots +Z(262, 144))/262, 144)$. Subsequently, a deviation from an average center line at each measurement point $Z''(i)$ $(=Z(i)-Zave)$ is determined. The arithmetic average roughness Ra [nm] $(=(Z''(1)+Z''(2)+ \ldots +Z''(262, 144))/262, 144)$ is calculated. At this time, one that has been subjected to filtering by Flattenorder2 and planefit order 3 XY as image processing is used as the data. (Note 1) SPM probe NCH normal type PointProbe L
(Cantilever length)=125 μm manufactured by NanoWorld Corporation The upper limit value of an average thickness $t_m$ of the magnetic layer 43 is 80 nm or less, favorably 70 nm or less, more favorably 50 nm or less. As the upper limit value of the average thickness $t_m$ of the magnetic layer 43 is 80 nm or less, the influence of the anti-magnetic field can be alleviated in a case where the ring type head is used as the recording head, and thus more excellent electromagnetic conversion characteristics can be obtained.

The lower limit value of the average thickness $t_m$ of the magnetic layer 43 is favorably 35 nm or more. As the lower limit value of the average thickness $t_m$ of the magnetic layer 43 is 35 nm or more, the output can be secured in a case where an MR type head is used as the reproducing head, and thus more excellent electromagnetic conversion characteristics can be obtained.

The average thickness $t_m$ of the magnetic layer 43 can be determined in the following manner. First of all, the magnetic tape 1, which is an object to be measured, is worked using the FIB technique or the like for thinning. In the case of using the FIB technique, carbon layers and a tungsten layer are formed as protection films as processing for observing a TEM image which is a cross-section to be described later. The carbon layers are formed on the surface of the magnetic tape 1, which is on the side of the magnetic layer 43, and the surface of the magnetic tape 1, which is on the side of the back layer 44, by using the vapor deposition method. Then, the tungsten layer is further formed on the surface of the magnetic tape 1, which is on the side of the magnetic layer 43, by using the vapor deposition method or the sputtering method. The thinning is performed in a length direction (longitudinal direction) of the magnetic tape 1. That is, the thinning forms a cross-section parallel to both of the longitudinal direction and the thickness direction of the magnetic tape 1.

Such a cross-section of the obtained thinned sample is observed through a transmissionelectron microscope (TEM) under the following condition and the TEM image is obtained. It should be noted that the magnification and the accelerating voltage may be adjusted as appropriate in a manner that depends on apparatus types.
Apparatus: TEM (H9000NAR manufactured by Hitachi, Ltd.)
Accelerating voltage: 300 kV
Magnification: 100,000 times Next, the thickness of the magnetic layer 43 is measured in at least ten or more longitudinal positions of the magnetic tape 1, using the obtained TEM image. The obtained measurement values are simply averaged (arithmetically averaged) and the obtained average value is used as the average thickness $t_m$ of the magnetic layer 43 [nm]. Note that it is assumed that the positions at which the measurement is conducted are randomly selected from the test piece.
(Magnetic Powder)

The magnetic powder includes a plurality of magnetic particles. The magnetic particles are, for example, particles including hexagonal ferrite (hereinafter, referred to as "hexagonal ferrite particles"), particles including epsilon-iron oxide (ε iron oxides) (hereinafter, referred to as "ε iron oxide particles"), or particles including Co-containing spinel ferrite (hereinafter, referred to as "cobalt ferrite particles"). Regarding the magnetic powder, it is favorable that the crystals are oriented preferentially in the direction (perpendicular direction) of the thickness of the magnetic tape 1.
(Hexagonal Ferrite Particles)

Each of the hexagonal ferrite particles has a plate shape such as a hexagonal plate shape, for example. In this specification, the hexagonal plate shape includes a substantially hexagonal plate shape. The hexagonal ferrite includes favorably at least one of Ba, Sr, Pb, or Ca, more favorably at least one of Ba or Sr. The hexagonal ferrite may be specifically barium ferrite or strontium ferrite, for example. The barium ferrite may further include at least one of Sr, Pb, or Ca other than Ba. The strontium ferrite may further include at least one of Ba, Pb, or Ca other than Sr.

More specifically, the hexagonal ferrite has an average combination represented by a general expression MFe12O19. It should be noted that M is at least one metal of Ba, Sr, Pb, or Ca, favorably at least one metal of Ba or Sr, for example. M may be a combination of Ba and one or more metals selected from a group of Sr, Pb, and Ca. Further, M may be a combination of Sr and a combination of one or more metals selected from a group of Ba, Pb, and Ca. In such a general expression, a part of Fe may be substituted by another metal element.

In a case where the magnetic powder includes the hexagonal ferrite particle powder, the average particle size of the magnetic powder is favorably 30 nm or less, more favorably 12 nm or more and 25 nm or less, much more favorably 15 nm or more and 22 nm or less, especially favorably 15 nm or more and 20 nm or less, most favorably 15 nm or more and 18 nm or less. In a case where the average particle size of the magnetic powder is 30 nm or less, more excellent electromagnetic conversion characteristics (e.g., SNR) can be obtained in the high-recording-density magnetic tape 1. On the other hand, in a case where the average particle size of the magnetic powder is 12 nm or more, the dispersibility of the magnetic powder is further enhanced and more excellent electromagnetic conversion characteristics (e.g., SNR) can be obtained.

The average aspect ratio of the magnetic powder is favorably 1.0 or more and 2.5 or less, more favorably 1.0 or more and 2.1 or less, much more favorably 1.0 or more and 1.8 or less. In a case where the average aspect ratio of the magnetic powder is within a range of 1.0 or more and 2.5 or less, agglomeration of the magnetic powder can be suppressed. Further, the resistance applied to the magnetic powder when orienting the magnetic powder perpendicularly in the formation process of the magnetic layer 43 can be suppressed. Therefore, the perpendicular orientation property of the magnetic powder can be enhanced.

In a case where the magnetic powder includes the hexagonal ferrite particle powder, the average particle size of the magnetic powder and the average aspect ratio can be determined in the following manner. First of all, the magnetic tape 1, which is the object to be measured, is worked using the FIB technique or the like for thinning. In the case of using the FIB technique, the carbon layer and the tungsten layer are formed as the protection films as pre-processing for observing the TEM image which is the cross-section to be described later. The carbon layers are formed on the surface of the magnetic tape 1, which is on the side of the magnetic layer 43, and the surface of the magnetic tape 1, which is on the side of the back layer 44, by using the vapor deposition method. Then, the tungsten layer is further formed on the surface of the magnetic tape 1, which is on the side of the magnetic layer 43, by using the vapor deposition method or the sputtering method. The thinning is performed in the length direction (longitudinal direction) of the magnetic tape 1. That is, the thinning forms a cross-section parallel to both of the longitudinal direction and the thickness direction of the magnetic tape 1.

The transmission electron microscope (H-9500 manufactured by Hitachi High-Technologies Corporation) is used for performing cross-section observation on such a cross-section of the obtained thinned sample so as to include the entire magnetic layer 43 with respect to the direction of the thickness of the magnetic layer 43 at the accelerating voltage: 200 kV, the total magnification: 500,000 times and take a TEM photograph. Next, 50 particles, which have the side surface in the direction of the observed surface, whose thickness can be obviously checked, are selected from the taken TEM photograph. A maximum plate thickness DA of each of the selected 50 particles, whose thickness can be obviously checked, is measured. The maximum plate thicknesses DA determined in this manner are simply averaged (arithmetically averaged) to determine the average maximum plate thickness $DA_{ave}$. Subsequently, a plate diameter DB of each particle of the magnetic powder is measured. In order to measure the plate diameter DB of the particle, 50 particles whose plate diameter can be obviously checked are selected from the taken TEM photograph. A plate diameter DB of each of the selected 50 particles is measured. The plate diameters DB determined in this manner are simply averaged (arithmetically averaged) to determine an average plate diameter $DB_{ave}$. The average plate diameter $DB_{ave}$ is the average particle size. Then, a particle average aspect ratio ($DB_{ave}/DA_{ave}$) is determined on the basis of the average maximum plate thickness $DA_{ave}$ and the average plate diameter $DB_{ave}$.

In a case where the magnetic powder includes the hexagonal ferrite particle powder, the average particle volume of the magnetic powder is favorably 5900 nm³ or less, more favorably 500 nm³ or more and 3400 nm³ or less, much more favorably 1000 nm³ or more and 2500 nm³ or less, especially favorably 1000 nm³ or more and 1800 nm³ or less, most favorably 1000 nm³ or more and 1500 nm³ or less. In a case where the average particle volume of the magnetic powder is 5900 nm³ or less, an effect similar to that in a case where the average particle size of the magnetic powder is 30 nm or less can be provided. On the other hand, in a case where the average particle volume of the magnetic powder is 500 nm³ or more, an effect similar to that in a case where the average particle size of the magnetic powder is 12 nm or more can be provided.

The average particle volume of the magnetic powder can be determined in the following manner. First of all, as described above with respect to the calculation method for the average particle size of the magnetic powder, an average long-axis length $DA_{ave}$ and the average plate diameter $DB_{ave}$ are determined. Next, an average volume V of the magnetic powder is determined in accordance with the following expression.

$$V = \frac{3\sqrt{3}}{8} \times DA_{ave} \times DB_{ave} \times DB_{ave} \quad [\text{Expression 1}]$$

(E Iron Oxide Particles)

The ε iron oxide particles are rigid magnetic particles which can provide high coercivity even as minute particles. The ε iron oxide particles have a spherical shape or a cubic shape. In this specification, the spherical shape includes a substantially spherical shape. Further, the cubic shape includes a substantially cubic shape. Since the ε iron oxide particles have such an shape, the contact area of the particles in the direction of the thickness of the magnetic tape 1 can be reduced and agglomeration of the particles can be suppressed in a case where the ε iron oxide particles are used as the magnetic particles in comparison with a case where barium ferrite particles having a hexagonal plate shape are used as the magnetic particles. Therefore, the dispersibility of the magnetic powder can be enhanced and more excellent electromagnetic conversion characteristics (e.g., SNR) can be obtained.

Each of the ε iron oxide particles has a core shell-shaped structure. Specifically, the ε iron oxide particle includes a core part and a shell part having a double-layer structure provided in a periphery of this core part. The shell part having the double-layer structure includes a first shell part provided on the core part and a second shell part provided on the first shell part.

The core part contains ε iron oxide. The ε iron oxide contained in the core part is favorably one having ε—$Fe_2O_3$ crystals as the main phase, more favorably one including single-phase ε—$Fe_2O_3$.

The first shell part covers at least a part of the periphery of the core part. Specifically, the first shell part may partially cover the periphery of the core part or may entirely cover the periphery of the core part. It is favorable that the first shell part covers the entire surface of the core part for making exchange coupling of the core part and the first shell part sufficient and enhancing the magnetic characteristics.

The first shell part is a so-called soft magnetic layer and includes a soft magnetic material such as α—Fe, a Ni—Fe alloy, and a Fe—Si—Al alloy, for example. The α—Fe may be obtained by reduction-oxidation of the ε iron oxide contained in the core part.

The second shell part is an oxidation cover film as an anti-oxidation layer. The second shell part includes α iron oxide, aluminum oxide, or silicon dioxide. The ε iron oxide includes at least one iron oxide of $Fe_3O_4$, $Fe_2O_3$, or FeO, for example. In a case where the first shell part contains α—Fe (soft magnetic material), the α iron oxide may be obtained by oxidizing α—Fe contained in the first shell part.

Since the ε iron oxide particle includes the first shell part as described above, coercivity Hc of the core part alone can be kept high for securing the stability to heat while the coercivity Hc of the entire ε iron oxide particle (core and shell particle) can be adjusted to the coercivity Hc suitable for recording. Further, since the ε iron oxide particle includes the second shell part as described above, degradation of the characteristics of the ε iron oxide particles due to a process in which the ε iron oxide particles are exposed to the air and the surfaces of the particles are rusted, for example, in the manufacturing processes of the magnetic tape 1 or before that process can be suppressed. Therefore, degradation of the characteristics of the magnetic tape 1 can be suppressed.

The ε iron oxide particle may include a shell part having a single-layer structure. In this case, the shell part has a configuration similar to that of the first shell part. It should be noted that for suppressing degradation of the characteristics of the ε iron oxide particles, it is favorably that as described above, the ε iron oxide particle includes the shell part having the double-layer structure.

The ε iron oxide particles may include an additive instead of the above-mentioned core shell structure or may be include the additive besides the core shell structure. In this case, a part of Fe of the ε iron oxide particles is substituted by the additive. Also with the ε iron oxide particles including the additive, the coercivity Hc of the entire ε iron oxide particle (core and shell particle) can be adjusted to the coercivity Hc suitable for recording, and thus recording easiness can be enhanced. The additive is a metal element other than iron, favorably a trivalent metal element, more favorably at least one of Al, Ga, or In, much more favorably at least one of Al or Ga.

Specifically, the ε iron oxide including the additive is ε—$Fe_{2-x}M_xO_3$ crystals (note that M is a metal element other than iron, favorably a trivalent metal element, more favorably at least one of Al, Ga, or In, much more favorably at least one of Al or Ga. The symbol, x is for example, $0<x<1$).

The average particle size (average maximum particle size) of the magnetic powder is, for example, 22.5 nm or less. The average particle size (average maximum particle size) of the magnetic powder is favorably 22 nm or less, more favorably 8 nm or more and 22 nm or less, much more favorably 12 nm or more and 22 nm or less, especially favorably 12 nm or more and 15 nm or less, most favorably 12 nm or more and 14 nm or less. In the magnetic tape 1, a region of a ½ size of the recording wavelength is an actual magnetization region. Therefore, by setting the average particle size of the magnetic powder is the shortest recording wavelength to be equal to or smaller than the half, more excellent electromagnetic conversion characteristics (e.g., SNR) can be obtained. Therefore, in a case where the average particle size of the magnetic powder is 22 nm or less, more excellent electromagnetic conversion characteristics (e.g., SNR) can be obtained in the high-recording-density magnetic tape 1 (e.g., the magnetic tape 1 configured to be capable of recording a signal at a shortest recording wavelength of 44 nm or less). On the other hand, in a case where the average particle size of the magnetic powder is 8 nm or more, the dispersibility of the magnetic powder is further enhanced and more excellent electromagnetic conversion characteristics (e.g., SNR) can be obtained.

In a case where the average aspect ratio of the magnetic powder is favorably 1.0 or more and 3.0 or less, more favorably 1.0 or more and 2.5 or less, much more favorably 1.0 or more and 2.1 or less, especially favorably 1.0 or more and 1.8 or less. In a case where the average aspect ratio of the magnetic powder is within a range of 1.0 or more and 3.0 or less, agglomeration of the magnetic powder can be suppressed. Further, the resistance applied to the magnetic powder when orienting the magnetic powder perpendicularly in the formation process of the magnetic layer 43 can be suppressed. Therefore, the perpendicular orientation property of the magnetic powder can be enhanced.

In a case where the magnetic powder includes the ε iron oxide particle powder, the average particle size of the magnetic powder and the average aspect ratio are determined in the following manner. First of all, the magnetic tape 1, which is the object to be measured, is worked and thinned by using the focused ion beam (FIB) technique or the like. In the case of using the FIB technique, the carbon layer and the tungsten layer are formed as the protection layers as pre-processing for observing the TEM image which is the cross-section to be described later. The carbon layers are formed on the surface of the magnetic tape 1, which is on the side of the magnetic layer 43, and the surface of the magnetic tape 1, which is on the side of the back layer 44, by using the vapor deposition method. Then, the tungsten layer is further formed on the surface of the magnetic tape 1, which is on the side of the magnetic layer 43, by using the vapor deposition method or the sputtering method. The thinning is performed in the length direction (longitudinal direction) of the magnetic tape 1. That is, the thinning forms a cross-section parallel to both of the longitudinal direction and the thickness direction of the magnetic tape 1.

The transmission electron microscope (H-9500 manufactured by Hitachi High-Technologies Corporation) is used for performing cross-section observation on such a cross-section of the obtained thinned sample so as to include the entire magnetic layer 43 with respect to the direction of the thickness of the magnetic layer 43 at the accelerating voltage: 200 kV, the total magnification: 500,000 times and take a TEM photograph. Next, 50 particles, whose shape can be obviously checked, are selected from the taken TEM photograph and a long-axis length DL and a short-axis length DS of each particle are measured. Here, the long-axis length DL means maximum one (so-called maximum Feret diameter) of distances between two parallel lines drawn at any angle so as to be held in contact with the outline of each particle. On the other hand, the short-axis length DS means maximum one of particle lengths in a direction orthogonal to a long axis (DL) of the particle. Subsequently, the measured long-axis lengths DL of the 50 particles are simply averaged (arithmetically averaged) to determine an average long-axis length $DL_{ave}$. The average long-axis length $DL_{ave}$ determined in this manner is set as the average particle size of the magnetic powder. Further, the measured short-axis lengths DS of the 50 particles are simply averaged (arithmetically averaged) to determine an average short-axis length $DS_{ave}$. Then, the average aspect ratio ($DL_{ave}/DS_{ave}$) of the particles are determined on the basis of the average long-axis length $DL_{ave}$ and the average short-axis length $DS_{ave}$. The average particle volume of the magnetic powder is favorably 5600 $nm^3$ or less, more favorably 250 $nm^3$ or more and 5600 $nm^3$ or less, much more favorably 900 $nm^3$ or more and 5600 $nm^3$ or less, especially favorably 900 $nm^3$ or more and 1800 $nm^3$ or less, most favorably 900 $nm^3$ or more and 1500 $nm^3$ or less. Since In general, noise of the magnetic tape 1 is inversely proportional to the square root of the number of particles (i.e., proportional to the square root of a particle volume), more excellent electromagnetic conversion characteristics (e.g., SNR) can be obtained by making the particle volume smaller. Therefore, in a case where the average particle volume of the magnetic powder is 5600 nm$^3$ or less, more excellent electromagnetic conversion characteristics (e.g., SNR) can be obtained as in a case where the average particle size of the magnetic powder is 22 nm or less. On the other hand, in a case where the average particle volume of the magnetic powder is 250 nm$^3$ or more, an effect similar to that in a case where the average particle size of the magnetic powder is 8 nm or more can be provided.

In a case where the ε iron oxide particles each have a spherical shape, the average particle volume of the magnetic powder can be determined in the following manner. First of all, the average long-axis length $DL_{ave}$ is determined as in the calculation method for the above-mentioned average particle size of the magnetic powder. Next, the average volume V of magnetic powder is determined in accordance with the following expression.

$$V=(\pi/6) \times DL_{ave}^3$$

In a case where the ε iron oxide particles each have the cubic shape, the average volume of magnetic powder can be determined in the following manner. The magnetic tape 1 is worked and thinned by using the focused ion beam (FIB) technique or the like. In the case of using the FIB technique, a carbon film and a tungsten thin film are formed as the protection films as pre-processing for observing the TEM image which is the cross-section to be described later. The carbon layers are formed on the surface of the magnetic tape 1, which is on the side of the magnetic layer 43, and the surface of the magnetic tape 1, which is on the side of the back layer 44, by using the vapor deposition method. Then, the tungsten thin film is further formed on the surface of the magnetic tape 1, which is on the side of the magnetic layer 43, by using the vapor deposition method or the sputtering method. The thinning is performed in the length direction (longitudinal direction) of the magnetic tape 1. That is, the thinning forms a cross-section parallel to both of the longitudinal direction and the thickness direction of the magnetic tape 1.

The transmission electron microscope (H-9500 manufactured by Hitachi High-Technologies Corporation) is used for performing cross-section observation on the obtained thinned sample so as to include the entire magnetic layer 43 with respect to the direction of the thickness of the magnetic layer 43 at the accelerating voltage: 200 kV, the total magnification: 500,000 times and take a TEM photograph. It should be noted that the magnification and the accelerating voltage may be adjusted as appropriate in a manner that depends on apparatus types. Next, 50 particles whose shape is obvious are selected from the taken TEM photograph, and a length DC of a side of each particle is measured. Subsequently, the measured lengths DC of the sides of the 50 particles are simply averaged (arithmetically averaged) to determine an average side length $DC_{ave}$. Next, the average volume $V_{ave}$ (particle volume) of magnetic powder is determined on the basis of the following expression by using the average side length $DC_{ave}$.

$$V_{ave}=DC_{ave}^3$$

(Cobalt Ferrite Particles)

It is favorable that the cobalt ferrite particles each has uniaxial crystal anisotropy. Since the cobalt ferrite particle has the uniaxial crystal anisotropy, crystals of the magnetic powder can be preferentially oriented in the direction (perpendicular direction) of the thickness of the magnetic tape 1. The cobalt ferrite particle has a cubic shape, for example. In this specification, the cubic shape includes a substantially cubic shape. The Co-containing spinel ferrite may further include at least one of Ni, Mn, Al, Cu, or Zn other than Co.

The Co-containing spinel ferrite has an average combination expressed by the following expression, for example.

$$Co_xM_yFe_2O_z$$

(where the symbol M is at least one metal of Ni, Mn, Al, Cu, or Zn, for example. The symbol x is a value in a range of 0.4×1.0. The symbol y is a value in a range of 0≤y≤0.3. It should be noted that x, y satisfies the relationship of (x+y)≤1.0. The symbol z is a value in a range of 3≤z≤4. A part of Fe may be substituted by another metal element.)

In a case where the magnetic powder includes the cobalt ferrite particle powder, the average particle size of the magnetic powder is favorably 25 nm or less, more favorably 8 nm or more and 23 nm or less, much more favorably 8 nm or more and 12 nm or less, especially favorably 8 nm or more and 11 nm or less. In a case where the average particle size of the magnetic powder is 25 nm or less, more excellent electromagnetic conversion characteristics (e.g., SNR) can be obtained in the high-recording-density magnetic tape 1. On the other hand, in a case where the average particle size of the magnetic powder is 8 nm or more, the dispersibility of the magnetic powder is further enhanced and more excellent electromagnetic conversion characteristics (e.g., SNR) can be obtained. The calculation method for the average particle size of the magnetic powder is similar to the calculation method for the average particle size of the magnetic powder in a case where the magnetic powder includes the ε iron oxide particle powder.

In a case where the average aspect ratio of the magnetic powder is favorably 1.0 or more and 3.0 or less, more favorably 1.0 or more and 2.5 or less, much more favorably 1.0 or more and 2.1 or less, especially favorably 1.0 or more and 1.8 or less. In a case where the average aspect ratio of the magnetic powder is within a range of 1.0 or more and 3.0 or less, agglomeration of the magnetic powder can be suppressed. Further, the resistance applied to the magnetic powder when orienting the magnetic powder perpendicularly in the formation process of the magnetic layer 43 can be suppressed. Therefore, the perpendicular orientation property of the magnetic powder can be enhanced. The calculation method for the average aspect ratio of the magnetic powder is similar to the calculation method for the average aspect ratio of the magnetic powder in a case where the magnetic powder includes the ε iron oxide particle powder.

The average particle volume of the magnetic powder is favorably 15000 nm$^3$ or less, more favorably 500 nm$^3$ or more and 12000 nm$^3$ or less, especially favorably 500 nm$^3$ or more and 1800 nm$^3$ or less, most favorably 500 nm$^3$ or more and 1500 nm$^3$ or less. In a case where the average particle volume of the magnetic powder is 15000 nm$^3$ or less, an effect similar to that in a case where the average particle size of the magnetic powder is 25 nm or less can be provided. On the other hand, in a case where the average particle volume of the magnetic powder is 500 nm$^3$ or more, an effect similar to that in a case where the average particle size of the magnetic powder is 8 nm or more can be provided. The calculation method for the average particle volume of the magnetic powder is similar to the calculation method for the average particle volume in a case where the ε iron oxide particles each have the cubic shape.

(Binder)

Examples of the binder can include thermoplastic resin, thermosetting resin, and reactive resin. Examples of the thermoplastic resin can include vinyl chloride, vinyl acetate, vinyl chloride-vinyl acetate copolymer, vinyl chloride-vinylidene chloride copolymer, vinyl chloride-acrylonitrile copolymer, acrylic ester-acrylonitrile copolymer, acrylic ester-vinyl chloride-vinylidene chloride copolymer, acrylic ester-acrylonitrile copolymer, acrylic ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyurethane resin, polyester resin, amino resin, and synthetic rubber.

Examples of the thermosetting resin can include phenol resin, epoxy resin, polyurethane curable resin, urea resin, melamine resin, alkyd resin, silicone resin, polyamine resin, and urea-formaldehyde resin.

For the purpose of improving the dispersibility of the magnetic powder, $-SO_3M$, $-OSO_3M$, $-COOM$, $P=O(OM)_2$ (where M denotes alkali metal such as a hydrogen atom, lithium, kalium, natrium, or the like), a side chain amine having a terminal function represented by $-NR1R2$, $-NR1R2R3^+X^-$, a main-chain amine represented by $>NR1R2^+X^-$ (where R1, R2, R3 denotes a hydrogen atom or a hydrocarbon group and $X^-$ denotes halogen element ions, inorganic ions, or organic ions such as fluorine, chlorine, bromine, and iodine), and further a polar functional group such as $-OH$, $-SH$, $-CN$, and an epoxy function may be introduced into all the binders described above. An introduction amount to the binders of those polar functional groups is favorably $10^{-1}$ to $10^{-8}$ mol/g, more favorably $10^{-2}$ to $10^{-6}$ mol/g.

(Lubricant)

The lubricant includes, for example, at least one of the fatty acid or the fatty acid ester, favorably both of the fatty acid and the fatty acid ester. The configuration in which the magnetic layer 43 includes the lubricant, particularly the configuration in which the magnetic layer 43 includes both of the fatty acid and the fatty acid ester contributes to the enhancement of the travel stability of the magnetic tape 1. More particularly, when the magnetic layer 43 includes the lubricant and has a thin hole, favorable travel stability can be achieved. It can be considered that the enhancement of the travel stability can be achieved because the dynamic frictional coefficient of the surface of the magnetic tape 1 on the magnetic layer 43 side is adjusted to the value suitable for travel of the magnetic tape 1 with the above-mentioned lubricant.

The fatty acid may be favorably a compound shown by the following general expression (1) or (2). For example, the fatty acid may include one of the compound shown in the following general expression (1) or the compound shown in the following the general expression (2) or may be include both.

Further, the fatty acid ester may be favorably a compound shown in the following general expression (3) or (4). For example, the fatty acid ester may include one of the compound shown in the following general expression (3) or the compound shown in the general expression (4) or may include both.

When the lubricant includes one of the compound shown in the general expression (1) or the compound shown in the general expression (2) or both and one of the compound shown in the general expression (3) or the compound shown in the general expression (4) or both, an increase in dynamic frictional coefficient due to repeating recording or reproduction of the magnetic tape 1 can be suppressed.

$$CH_3(CH_2)_kCOOH \qquad (1)$$

(Note that in the general expression (1), k is an integer selected from a range of 14 or more and 22 or less, more favorably a range of 14 or more and 18 or less.)

$$CH_3(CH_2)_nCH=CH(CH_2)_mCOOH \qquad (2)$$

(Note that in the general expression (2), the sum of n and m is an integer selected from a range of 12 or more and 20 or less, more favorably a range of 14 or more and 18 or less.)

$$CH_3(CH_2)_pCOO(CH_2)_qCH_3 \qquad (3)$$

(Note that in the general expression (3), p is an integer selected from 14 or more and 22 or less, more favorably a range of 14 or more and 18 or less and q is an integer selected from a range of 2 or more and 5 or less, more favorably a range of 2 or more and 4 or less.)

$$CH_3(CH_2)_rCOO-(CH_2)_sCH(CH_3)_2 \qquad (4)$$

(Note that in the general expression (4), r is an integer selected from a range of 14 or more and 22 or less and s is an integer selected from a range of 1 or more and 3 or less.)

(Antistatic Agent)

Examples of the antistatic agent can include carbon black, natural surfactant, nonionic surfactant, and cationic surfactant.

(Abrasive)

Examples of the abrasive can include α-alumina, β-alumina, γ-alumina having an α-conversion rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxide obtained by dehydrating and annealing a raw material of magnetic iron oxide, and those obtained by subjecting them to surface treatment with aluminum and/or silica as necessary.

(Curing Agent)

Examples of the curing agent can include an polyisocyanate. Examples of the polyisocyanate can include an aromatic polyisocyanate such as an adduct of tolylene diisocyanate (TDI) and an active hydrogen compound and an aliphatic polyisocyanate such as an adduct of hexamethylene diisocyanate (HMDI) and an active hydrogen compound. The weight average molecular weight of those polyisocyanates is desirably in a range of 100 to 3000.

(Corrosion Inhibitor)

Examples of the corrosion inhibitor can include phenols, naphthols, quinones, heterocyclic compounds containing nitrogen atoms, heterocyclic compounds containing oxygen atoms, and heterocyclic compounds containing sulfur atoms.

(Nonmagnetic Reinforcing Particles)

The non-magnetic reinforcing particles can include aluminum oxide (α, β, or γ alumina), chromium oxide, silicon oxide, diamond, garnet, emery, boron nitride, titanium carbide, silicon carbide, titanium carbide, titanium oxide (rutile or anatase type titanium oxide).

(Underlayer)

The underlayer 42 is for alleviating irregularities of the surface of the base material 41 and adjusting irregularities of the surface of the magnetic layer 43. The underlayer 42 is a non-magnetic layer including non-magnetic powder, a binder, and a lubricant. The underlayer 42 supplies the surface of the magnetic layer 43 with the lubricant. The underlayer 42 may further include at least one additive of an antistatic agent, a curing agent, a corrosion inhibitor, or the like in a manner that depends on needs.

The average thickness of the underlayer 42 is favorably 0.3 μm or more and 2.0 μm or less, more favorably 0.5 μm or more and 1.4 μm or less. It should be noted that the average thickness of the underlayer 42 can be determined in a manner that similar to that for the average thickness of the magnetic layer 43. It should be noted that the magnification of the TEM image is adjusted as appropriate in a manner that depends on the thickness of the underlayer 42. In a case where the average thickness of the underlayer 42 is 2.0 μm or less, the elasticity of the magnetic tape 1 due to external force further increases, and thus adjustment of the width of the magnetic tape 1 due to tension adjustment becomes easier.

(Non-Magnetic Powder)

The non-magnetic powder includes at least one of inorganic particle powder or organic particle powder, for example. Further, the non-magnetic powder may include carbon powder such as carbon black. It should be noted that one kind of non-magnetic powder may be used alone or two or more kinds of non-magnetic powder may be used in combination. Examples of the inorganic particles can include a metal, a metal oxide, a metal carbonate, a metal sulfate, a metal nitride, a metal carbide, and a metal sulfide. Various shapes such as a needle-shape, a spherical shape, a cubic shape, and a plate shape can be exemplified as the shape of the non-magnetic powder, though not limited to those shapes.

(Binder and Lubricant)

The binder and the lubricant are similar to those of the magnetic layer 43.

(Additive)

The antistatic agent, the curing agent, and the corrosion inhibitor are respectively similar to those of the magnetic layer 43.

(Back Layer)

The back layer 44 includes a binder and non-magnetic powder. The back layer 44 may further include at least one additive of a lubricant, a curing agent, an antistatic agent, or the like in a manner that depends on needs. The binder and non-magnetic powder are similar to those of the underlayer 42.

The average particle size of the non-magnetic powder is favorably 10 nm or more and 150 nm or less, more favorably 15 nm or more and 110 nm or less. The average particle size of the non-magnetic powder can be determined in a manner that similar to that for the above-mentioned average particle size of the magnetic powder. The non-magnetic powder may include non-magnetic powder having two or more particle size distributions.

The upper limit value of the average thickness of the back layer 44 is favorably 0.6 μm or less. In a case where the upper limit value of the average thickness of the back layer 44 is 0.6 μm or less, the underlayer 42 and the base material 41 can be kept thick also if the average thickness of the magnetic tape 1 is 5.6 μm or less. The travel stability of the magnetic tape 1 inside the recording/reproducing apparatus can be thus kept. Although it is not particularly limited, the lower limit value of the average thickness of the back layer 44 is, for example, 0.2 μm or more.

An average thickness $t_b$ of the back layer 44 can be determined in the following manner. First of all, an average thickness $t_T$ of the magnetic tape 1 is measured. The measurement method of the average thickness $t_T$ is as described in "Average Thickness of Magnetic Tape" below. Subsequently, the back layer 44 of the sample is removed with a solvent such as methyl ethyl ketone (MEK) and dilute hydrochloric acid. Next, the Laser Hologage (LGH-110C) manufactured by Mitutoyo Corporation is used to measure the thickness of the sample at five or more positions and simply average (arithmetically average) those measurement values for calculating an average value $t_B$ [μm]. After that, the average thickness $t_b$ of the back layer 44 [μm] is determined in accordance with the following expression. Note that it is assumed that the measurement positions are randomly selected from the sample.

$$t_b[\mu m]=t_T[\mu m]-t_B[\mu m]$$

The back layer 44 includes a surface provided with numerous protrusions. The numerous protrusions are for forming numerous hole portions in the surface of the magnetic layer 43 under a state in which the magnetic tape 1 has been wound in a roll shape. The numerous hole portions are constituted by numerous non-magnetic particles projected from the surface of the back layer 44, for example.

(Average Thickness of Magnetic Tape)

The upper limit value of the average thickness of the magnetic tape 1 (average total thickness) $t_T$ is 5.6 μm or less, favorably 5.0 μm or less, more favorably 4.6 μm or less, much more favorably 4.4 μm or less. In a case where the average thickness $t_T$ of the magnetic tape 1 is 5.6 μm or less, the recording capability of a single data cartridge can be made larger than that of a general magnetic tape. Although it is not particularly limited, the lower limit value of the average thickness $t_T$ of the magnetic tape 1 is, for example, 3.5 μm or more.

The average thickness $t_T$ of the magnetic tape 1 can be determined in the following manner. First of all, the magnetic tape 1 having a width of ½ inch is prepared, it is cut to have a length of 250 mm, and a sample is fabricated. Next, the Laser Hologage (LGH-110C) manufactured by Mitutoyo Corporation is used as the measurement apparatus to measure the thickness of the sample at five or more positions and simply average (arithmetically average) those measurement values for calculating an average value $t_T$ [μm]. Note that it is assumed that the measurement positions are randomly selected from the sample.

(Coercivity Hc)

The upper limit value of the coercivity Hc2 of the magnetic layer 43 in the longitudinal direction of the magnetic tape 1 is favorably 2000 Oe or less, more favorably 1900 Oe or less, much more favorably 1800 Oe or less. In a case where the coercivity Hc2 of the magnetic layer 43 in the longitudinal direction is 2000 Oe or less, sufficient electromagnetic conversion characteristics can be provided even at high recording-density.

The lower limit value of the coercivity Hc2 of the magnetic layer 43, which is measured in the longitudinal direction of the magnetic tape 1, is favorably 1000 Oe or more. In a case where the coercivity Hc2 of the magnetic layer 43, which is measured in the longitudinal direction, is 1000 Oe or more, demagnetization due to a magnetic flux leaking from the recording head can be suppressed.

The above-mentioned coercivity Hc2 can be determined in the following manner. First of all, three magnetic tapes 1 are made to overlap one another with double sided tapes, and then they are punched with a punch of φ6.39 mm, such that the measurement sample is fabricated. At this time, marking is performed with any non-magnetic ink such that the longitudinal direction (travel direction) of the magnetic tape 1 can be recognized. Then, the Vibrating Sample Magnetometer (VSM) is used to measure an M-H loop of the measurement sample (the entire magnetic tape 1) corresponding to the longitudinal direction (travel direction) of the magnetic tape 1. Next, the coating film (such as the underlayer 42, the magnetic layer 43, and the back layer 44) is swept away with acetone, ethanol, or the like, such that only the base material 41 is left. Then, three obtained base materials 41 are made to overlap one another with double sided tapes, and then they are punched with a punch of ϕ6.39 mm, such that a sample for back ground correction (hereinafter, simply referred to as "correction sample") is fabricated. After that, an M-H loop of the correction sample (the base material 41) corresponding to the perpendicular direction of the base material 41 (the perpendicular direction of the magnetic tape 1) is measured by using the VSM.

In measurement of the M-H loop of the measurement sample (the entire magnetic tape 1) and the M-H loop of the correction sample (the base material 41), "VSM-P7-15" High Sensitivity Vibrating Sample Magnetometer manufactured by Toei Industry Co., Ltd. is used. The measurement condition is the measurement mode: full-loop, maximum magnetic field: 15 kOe, magnetic field step: 40 bit, time constant of locking amp: 0.3 sec, waiting time: 1 sec, MH average number: 20.

The M-H loop of the measurement sample (the entire magnetic tape 1) and the M-H loop of the correction sample (the base material 41) are obtained. Then, back ground correction is performed in such a manner that the M-H loop of the correction sample (the base material 41) is subtracted from the M-H loop of the measurement sample (the entire magnetic tape 1). As a result, the M-H loop after back ground correction is obtained. A measurement and analysis program belonging to the "VSM-P7-15 type" is used for this back ground correction calculation. The coercivity Hc2 is determined on the basis of the obtained the M-H loop after back ground correction. It should be noted that The measurement and analysis program belonging to the "VSM-P7-15 type" is used for this calculation. It should be noted that such M-H loop measurement processes are both performed at 25° C. Further, the "anti-magnetic field correction" in measuring the M-H loop in the longitudinal direction of the magnetic tape 1 is not performed.

(Squareness Ratio)

A squareness ratio S1 of the magnetic layer 43 in the perpendicular direction (the thickness direction) of the magnetic tape 1 is favorably 65% or more, more favorably 70% or more, much more favorably 75% or more, especially favorably 80% or more, most favorably 85% or more. In a case where the squareness ratio S1 is 65% or more, the perpendicular orientation property of the magnetic powder is sufficiently enhanced, and thus more excellent electromagnetic conversion characteristics (e.g., SNR) can be obtained.

The squareness ratio S1 in the perpendicular direction can be determined in the following manner. First of all, three magnetic tapes 1 are made to overlap one another with double sided tapes. Then, they are punched with a punch of ϕ6.39 mm, such that the measurement sample is fabricated. At this time, marking is performed with any non-magnetic ink such that the longitudinal direction (travel direction) of the magnetic tape 1 can be recognized. Then, the M-H loop of the measurement sample (the entire magnetic tape 1) corresponding to the perpendicular direction (the thickness direction) of the magnetic tape 1 is measured by using the VSM. Next, the coating film (such as the underlayer 42, the magnetic layer 43, and the back layer 44) is swept away with acetone, ethanol, or the like, such that only the base material 41 is left. Then, three obtained base materials 41 are made to overlap one another with double sided tapes, and then they are punched with a punch of ϕ6.39 mm, such that a sample for back ground correction (hereinafter, simply referred to as "correction sample") is fabricated. After that, an M-H loop of the correction sample (the base material 41) corresponding to the perpendicular direction of the base material 41 (the perpendicular direction of the magnetic tape 1) is measured by using the VSM.

In measurement of the M-H loop of the measurement sample (the entire magnetic tape 1) and the M-H loop of the correction sample (the base material 41), "VSM-P7-15" High Sensitivity Vibrating Sample Magnetometer manufactured by Toei Industry Co., Ltd. is used. The measurement condition is set such that the measurement mode: the full-loop, maximum magnetic field: 15 kOe, magnetic field step: 40 bit, time constant of locking amp: 0.3 sec, waiting time: 1 sec, MH average number: 20.

The M-H loop of the measurement sample (the entire magnetic tape 1) and the M-H loop of the correction sample (the base material 41) are obtained. Then, back ground correction is performed in such a manner that the M-H loop of the correction sample (the base material 41) is subtracted from the M-H loop of the measurement sample (the entire magnetic tape 1). As a result, the M-H loop after back ground correction is obtained. The measurement and analysis program belonging to the "VSM-P7-15 type" is used for this back ground correction calculation.

The saturation magnetization Ms (emu) and residual magnetization Mr (emu) of the obtained M-H loop after back ground correction are substituted into the following expression, and the squareness ratio S1(%) is calculated. It should be noted that the above-mentioned M-H loop measurement processes are both performed at 25° C. Further, the "anti-magnetic field correction" in measuring the M-H loop in the perpendicular direction of the magnetic tape 1 is not performed. It should be noted that the measurement and analysis program belonging to the "VSM-P7-15 type" is used for this calculation.

$$\text{Squareness ratio } S1(\%) = (Mr/Ms) \times 100$$

The squareness ratio S2 of the magnetic layer 43 in the longitudinal direction (travel direction) of the magnetic tape 1 is favorably 35% or less, more favorably 30% or less, much more favorably 25% or less, especially favorably 20% or less, most favorably 15% or less. In a case where the squareness ratio S2 is 35% or less, the perpendicular orientation property of the magnetic powder is sufficiently enhanced, and thus more excellent electromagnetic conversion characteristics (e.g., SNR) can be obtained.

The squareness ratio S2 in the longitudinal direction can be determined in a manner that similar to that for the squareness ratio S1 except for measuring the M-H loop in the longitudinal direction (travel direction) of the magnetic tape 1 and the base material 41.

(Surface Roughness Rb of Back Surface)

It is favorably that the surface roughness $R_b$ of the back surface (the surface roughness of the back layer 44) is $R_b \le 6.0$ [nm]. In a case where the surface roughness $R_b$ of the back surface is in such a range, more excellent electromagnetic conversion characteristics can be obtained.

[Configuration of Servo Pattern Recording Apparatus]

Subsequently, a configuration of the servo pattern recording apparatus will be described.

As shown in FIG. 3, the magnetic layer 43 includes a plurality of data bands d (data bands d0 to d3) and a plurality of servo bands s (servo bands s0 to s4) arranged at positions to sandwich the data band d in the width direction (the Y-axis direction). The data band d includes a plurality of recording tracks 5 long in the longitudinal direction and data is recorded for each of those recording tracks 5. The servo band s includes the servo pattern 6 which is a predetermined pattern recorded by the servo pattern recording apparatus 100. For example, a recording head of a recording apparatus (not shown) that records various types of data such as electronic data recognizes the position of the recording track 5 by reading the servo pattern 6 recorded in the magnetic layer 4.

Referring to FIGS. 1 and 2, the servo pattern recording apparatus 100 includes a feed roller 11, a pre-processing unit 12, a servo write head 13, a reproducing head unit 14, and a winding roller 15 in the stated order from the upstream side in a conveyance direction of the magnetic tape 1. It should be noted that the servo pattern recording apparatus 100 includes, as will be described later, a drive unit 20 that drives the servo write head 13 and a controller 30. The controller 30 includes a control unit that comprehensively controls the respective blocks of the servo pattern recording apparatus 100, a recording unit that stores various programs and various types of data required for processing of the control unit, a display unit that displays data, the input unit that inputs data, and the like.

The feed roller 11 is enabled to rotatably support the magnetic tape 1 (before recording the servo pattern 6) in a roll shape. The feed roller 11 is rotated in accordance with driving of the driving source such as a motor and feeds the magnetic tape 1 toward the downstream in accordance with the rotation.

The winding roller 15 is enabled to rotatably support the magnetic tape 1 (after recording the servo pattern 6) in a roll shape. The winding roller 15 rotates in synchronization with the feed roller 11 in accordance with driving of the driving source such as the motor and winds the magnetic tape 1 in which the servo pattern 6 is recorded in accordance with the rotation. The feed roller 11 and the winding roller 15 are enabled to move the magnetic tape 1 at constant speed on the conveyance path.

The servo write head 13 is arranged on the upper side (the magnetic layer 43 side) of the magnetic tape 1, for example. It should be noted that the servo write head 13 may be arranged on the lower side (the base material 41 side) of the magnetic tape 1. The servo write head 13 generates a magnetic field at a predetermined timing in accordance with a rectangular-wave pulse signal and applies the magnetic field to a part of the magnetic layer 43 (after pre-processing) of the magnetic tape 1.

Accordingly, the servo write head 13 magnetizes a part of the magnetic layer 43 in a first direction and records the servo pattern 6 in the magnetic layer 43 (see the black arrow in FIG. 2 for the magnetization direction). When the magnetic layer 43 passes by the lower side of the servo write head 13, the servo write head 13 is enabled to record the servo pattern 6 with respect to each of the five servo bands s0 to s4.

The first direction that is the magnetization direction of the servo pattern 6 includes a perpendicular component perpendicular to the upper surface of the magnetic layer 43. That is, in this embodiment, the magnetic layer 43 includes magnetic powder perpendicularly oriented or not oriented, and thus the servo pattern 6 to be recorded in the magnetic layer 43 includes a perpendicular magnetization component.

The pre-processing unit 12 is arranged on the lower side (the base material 41 side) of the magnetic tape 1 at the upstream side as compared to the servo write head 13, for example. The pre-processing unit 12 may be arranged on the upper side (the magnetic layer 43 side) of the magnetic tape 1. The pre-processing unit 12 includes a permanent magnet 12a rotatable about a center axis of rotation in the Y-axis direction (the width direction of the tape 1). The shape of the permanent magnet 12a has a columnar shape or a polygonal columnar shape, for example, though not limited thereto.

The permanent magnet 12a applies a magnetic field to the entire magnetic layer 43 due to a direct-current magnetic field before the servo write head 13 records the servo pattern 6 and demagnetizes the entire magnetic layer 43. Accordingly, the permanent magnet 12a is capable of magnetizing the magnetic layer 43 in advance in a second direction that is a direction opposite to the magnetization direction of the servo pattern 6 (see the white arrow in FIG. 2). By respectively setting the two magnetization directions to be opposite directions in this manner, the reproduction waveform of the servo signal obtained by reading the servo pattern 6 can be made symmetric in upper and lower directions (±) (see FIG. 4(B)).

The reproducing head unit 14 is arranged on the upper side (the magnetic layer 43 side) of the magnetic tape 1 at the downstream side as compared to the servo write head 13. The reproducing head unit 14 is pre-processed by the pre-processing unit 12 and the servo write head 13 reads the servo pattern 6 of the magnetic layer 43 of the magnetic tape 1 in which the servo pattern 6 is recorded. The reproduction waveform of the servo pattern 6 read by the reproducing head unit 14 is displayed on the screen of the display unit. Typically, the reproducing head unit 14 detects a magnetic flux generated from the surface of the servo band s e magnetic layer 43 passes by the lower side of the reproducing head unit 14. The magnetic flux detected at this time is the reproduction waveform of the servo pattern 6 in the servo signal.

[Servo Pattern]

Figure 4:
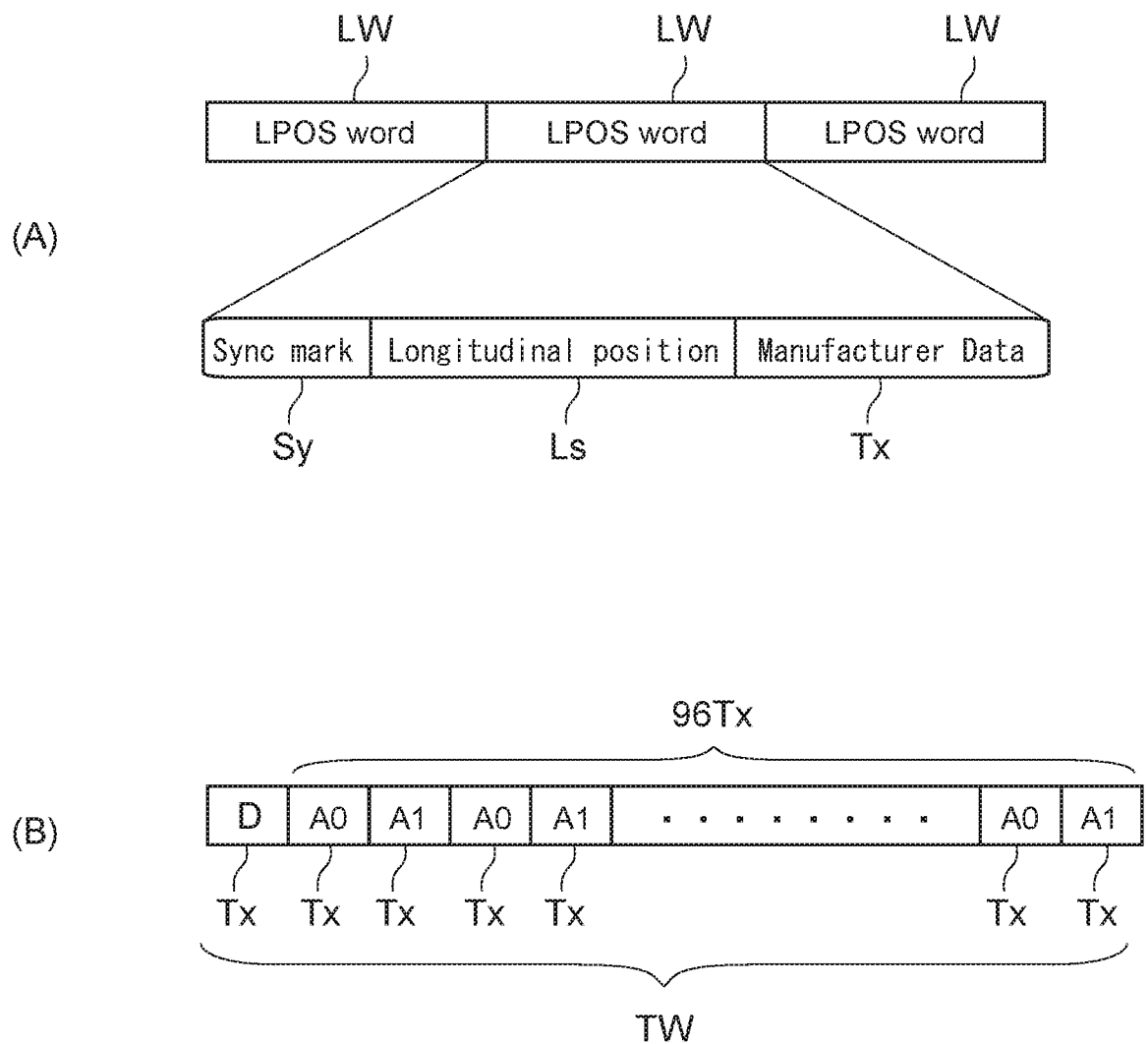
FIG. 4(A) is a diagram describing a data structure of an LPOS word embedded in the servo pattern and (B) is a diagram describing a manufacturer word.

The servo pattern 6 has a data structure according to "ECMA-319 standard". FIG. 4(A) is a diagram showing a data structure of an LPOS word embedded in the servo pattern 6. FIG. 4(B) is a diagram describing a manufacturer word.

As shown in FIG. 4(A), a plurality of longitudinal position (LPOS) words LW continuously arranged in the tape longitudinal direction is embedded in the servo pattern 6. Each of the LPOS words LW is constituted by 36-bit data an 8-bit synchronization mark Sy meaning the head, six LPOS values Ls each constituted by four bits (total of 24 bits) indicating the position (address) in the tape longitudinal direction, and 4-bit manufacturer data Tx.

A manufacturer data Tx forms the manufacturer word TW on the magnetic tape 1. As shown in FIG. 4(B), the manufacturer word TW has a length of 97 pieces of manufacturer data Tx and can be obtained by successively reading 97 LPOS words LW. The manufacturer word TW is configured as follows.

the manufacturer word TW: D, A0, A1, A0, A1, . . . , A0, A1

"D" that is the first manufacturer data Tx is a symbol indicating that it is the head of the manufacturer word TW. Four-bit data (typically, "0001") converted in a predetermined table is written in it.

Ninety-six pieces of manufacturer data Tx following the first manufacturer data Tx are constituted by "A0" and "A1" alternately arranged and two adjacent "A0" and "A1" form a symbol pair. Arbitrary 13 basic symbols (typically, 0, 1, 2, 3, 4, 5, 6, 7, 8, 9, A, B, and C) other than "D" are each written in each symbol pair of "A0" and "A1". Those 13 basic symbols are also constituted by 4-bit data converted in the above-mentioned predetermined table. Then, a single symbol (hereinafter, also referred to as LPOS recording value) determined in a manner that depends on a combination of a particular two basic symbols (corresponding to the symbol pair) among the 13 basic symbols is identified.

The LPOS recording value is constituted by 8-bit data. Two basic symbols that form the symbol pair may be a combination of the same symbols (e.g., 0 and 0) or may be a combination of different symbols (e.g., 0 and 1).

Servo band identification information for identifying the servo band and the like as well as manufacturer information expressed as the LPOS recording value and management information regarding such as the date of manufacture, serial number, and the like of the magnetic tape are typically embedded in the 96 pieces of manufacturer data Tx configured in the above-mentioned manner.

Figure 5:
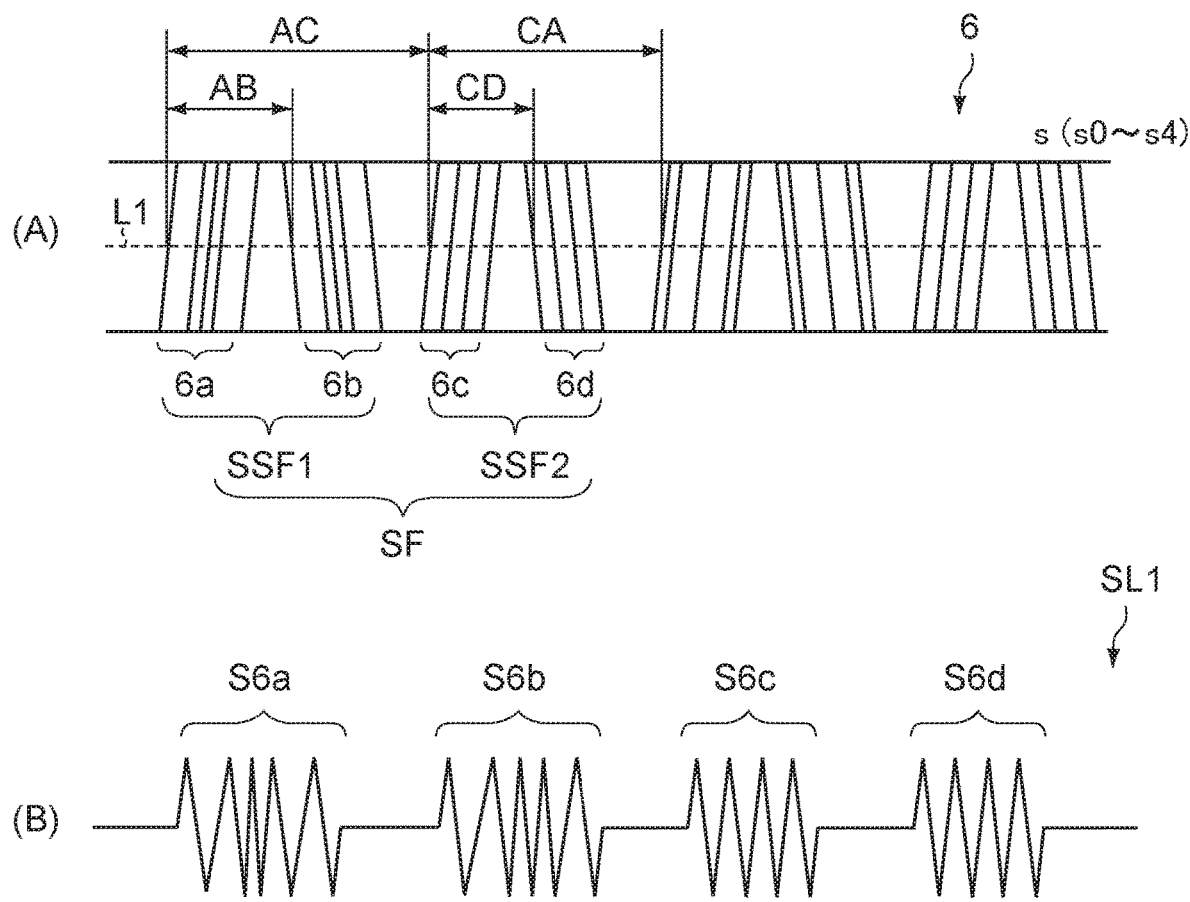
FIG. 5(A) is a schematic diagram showing an arrangement example of the servo pattern and (B) is a diagram showing a reproduction waveform.

FIG. 5(A) is a schematic plan view showing an arrangement example of the servo pattern 6. FIG. 5(B) is a diagram showing the reproduction waveform.

In a timing-based servo type head tracking servo, the servo pattern includes a plurality of azimuthal slope (azimuthal slope) patterns in two or more different shapes. The position of the servo head is recognized on the basis of a time duration taken to read two tilt patterns in different shapes and a time duration taken to read two tilt patterns in the same shape. The position of the magnetic head (the reproducing head or the recording head) in the width direction of the magnetic tape is controlled on the basis of the thus recognized position of the servo head.

As shown in FIG. 5(A), the servo pattern 6 form servo frames SF each including a first servo sub-frame SSF1 and a second servo sub-frame SSF2. The servo frames SF are continuously arranged at predetermined intervals in the tape longitudinal direction. Each servo frame SF encodes a single bit of "1" or "0". That is, one servo frame SF corresponds to one bit.

The first servo sub-frame SSF1 is constituted by an A burst 6a and a B burst 6b. The A burst 6a is constituted by a pattern of five straight lines tilting in the first direction with respect to the tape longitudinal direction. The B burst 6b is constituted by a pattern of five straight lines tilting in a second direction opposite to the first direction with respect to the tape longitudinal direction.

On the other hand, the second servo sub-frame SSF2 is constituted by a C burst 6c and a D burst 6d. The C burst 6c is constituted by a pattern of four straight lines tilting in the above-mentioned first direction. The D burst 6d is constituted by a pattern of four straight lines tilting in the above-mentioned second direction.

The lengths of the servo frames SF and the respective servo sub-frames SSF1 and SSF2, the arrangement intervals of the tilting portions that tilt in the respective bursts 6a to 6d, and the like can be arbitrarily set in a manner that depends on magnetic tape types, specifications, and the like.

The reproduction waveform of the servo pattern 6 typically exhibits a burst waveform as shown in FIG. 5(B). A signal S6a corresponds to the A burst 6a, a signal S6b corresponds to the B burst 6b, a signal S6c corresponds to the C burst 6c, and a signal S6d corresponds to the D burst 6d.

In the timing-based servo type head tracking servo, a position error signal (PES) is generated by reading the servo pattern 6 on two servo bands adjacent to one data band, and a recording/reproducing head with respect to a recording track in that data band is suitably positioned. Typically, the servo pattern 6 is read from the magnetic tape travelling at a predetermined speed. Then, a ratio of a distance (the time duration) AC between the A burst 6a and the C burst 6c that are an array of the tilt patterns in the same shape as each other to a distance (the time duration) AB between the A burst 6a and the B burst 6b that are an array of the tilt patterns in the different shapes from each other (or a ratio of a distance CA between the C burst 6c and the A burst 6a to a distance CD between the C burst 6c and the D burst 6d) is calculated. Then, the magnetic head is moved in a tape width direction such that such a value equals to a setting value set for each recording track.

[Identification of Data Band]

Servo band identification information in a different combination for each data band is written in each of the servo bands s (s0 to s4). For example, servo band identification information combinations obtained on the basis of two servo bands s2 and s3 adjacent to the data band d0 are different as each of a servo band identification information combination obtained on the basis of the servo bands s1 and s2 adjacent to the data band d1, a servo band identification information combination obtained on the basis of the servo bands s3 and s4 adjacent to the data band d2, and a servo band identification information combination obtained on the basis of two servo bands s0 and s1 adjacent to the data band d3. The individual data bands can be identified by setting the servo band identification information obtained on the basis of two servo bands adjacent to one data band to be different from the servo band identification information obtained on the basis of two servo bands adjacent to another data band in this manner.

Figure 6:
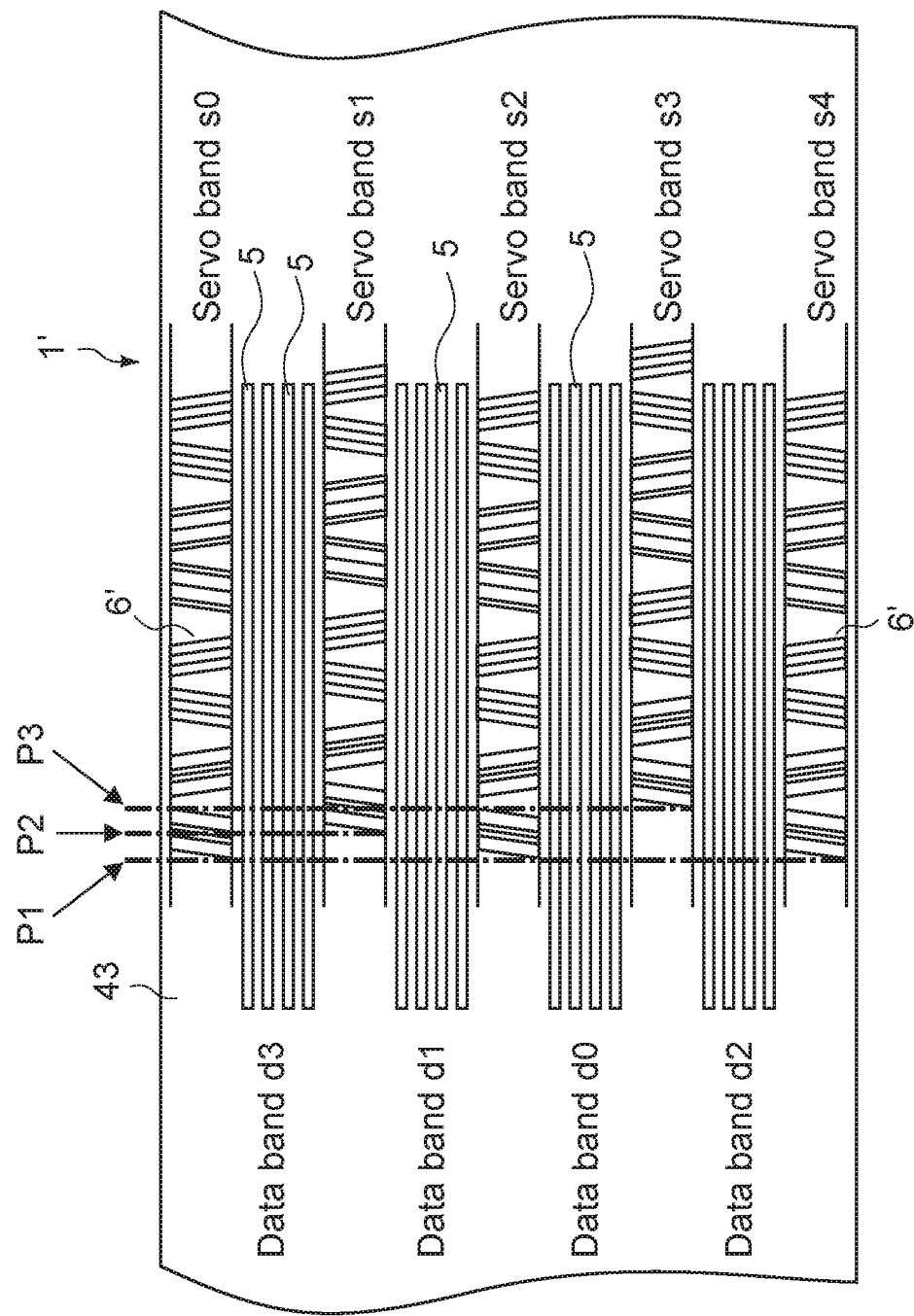
FIG. 6. A schematic diagram showing an arrangement example of a servo pattern according to a comparative example.

As a method of setting the servo band identification information combination to be different for each data band as described above, there is known a method of setting the phase of the reproduction waveform of the servo pattern to be different between the servo bands as shown in FIG. 6. FIG. 6 is a schematic diagram showing an arrangement example of a servo pattern 6' according to a comparative example.

The magnetic tape 1' shown in FIG. 6 includes the four data bands d0 to d4 and the five servo bands s0 to s4. The servo pattern 6' in a form similar to that of FIG. 5(A) is recorded in each of the servo bands s0 to s4. However, the record position is different.

That is, as shown in FIG. 6, the end portions of the servo patterns 6' to be recorded in the servo bands s0, s2, and s4 of the servo bands s0 to s4 are arranged to be aligned in a virtual line P1 parallel to the tape width direction (the Y-axis direction). On the other hand, the end portions of the servo patterns 6' to be recorded in the servo band s1 positioned between the servo band s0 and the servo band s2 are arranged on a virtual line P2 shifted by a predetermined distance from the virtual line P1 in the tape longitudinal direction. In addition, the end portions of the servo patterns 6' to be recorded in the servo band s3 positioned between the servo band s2 and the servo band s4 are arranged on a virtual line P3 further shifted by a predetermined distance from the virtual line P2 in the tape longitudinal direction.

In accordance with this method, the phase difference of the reproduction waveform of the servo pattern differs between the respective servo bands, and thus the position of the data band, which is to be subjected to recording/reproducing, can be identified on the basis of the phase difference of the reproduction waveform between the two adjacent servo bands. The phase difference of the reproduction waveform between the two adjacent servo bands is typically acquired on the basis of the PES to be referred to as for tracking control.

However, PESs also have a phase difference, and there is thus a problem that an error of precision enhancement due to PES averaging and an error of azimuth adjustment of the drive head occur. In particular, if the number of data bands is further increased due to the demand for high-density recording of the magnetic tape in recent years, the number of servo bands also increases. Therefore, providing numerous phase differences of the reproduction waveform between the servo bands makes it difficult to stably detect the servo band position.

In view of this, in this embodiment, as shown in FIG. 3, the end portions of the respective servo patterns 6 are arranged on a virtual line P0 parallel to the tape width direction such that the servo patterns 6 to be recorded in the respective servo bands are each on the same phase. Accordingly, the servo pattern on each servo band can be detected with high accuracy without being affected by the phase differences of the PESs.

The same phase set forth herein refers to a pattern form obtained when the servo patterns 6 are recorded for all the servo bands s0 to s4 at the same time and refers to substantially no phase differences between the servo patterns.

Moreover, the two types of servo bands are used for identifying the data band d0 to d4, which are to be subjected to recording/reproducing, are used in this embodiment. As described above, the servo band identification information is embedded in the servo band. The servo band identification information is multi-bit information. The servo band identification information is embedded at a predetermined position in the 96 pieces of manufacturer data Tx following the first manufacturer data Tx in the manufacturer word TW. The servo band identification information has typically four bits. Alternatively, the servo band identification information may have eight bits (a combination of the symbol pairs of "A0" and "A1") or may have a plurality of bits other than the four bits or the eight bits. Hereinafter, the description will be given by showing a case where the servo band identification information has four bits as an example.

In this embodiment, the two types of servo bands includes a first servo band in which the first servo band identification information is recorded and the second servo band in which the second servo band identification information is recorded. The first servo band identification information is 4-bit information (e.g., "1001"). The second servo band identification information is 4-bit information (e.g., "0111") different from the first servo band identification information.

Figure 7:
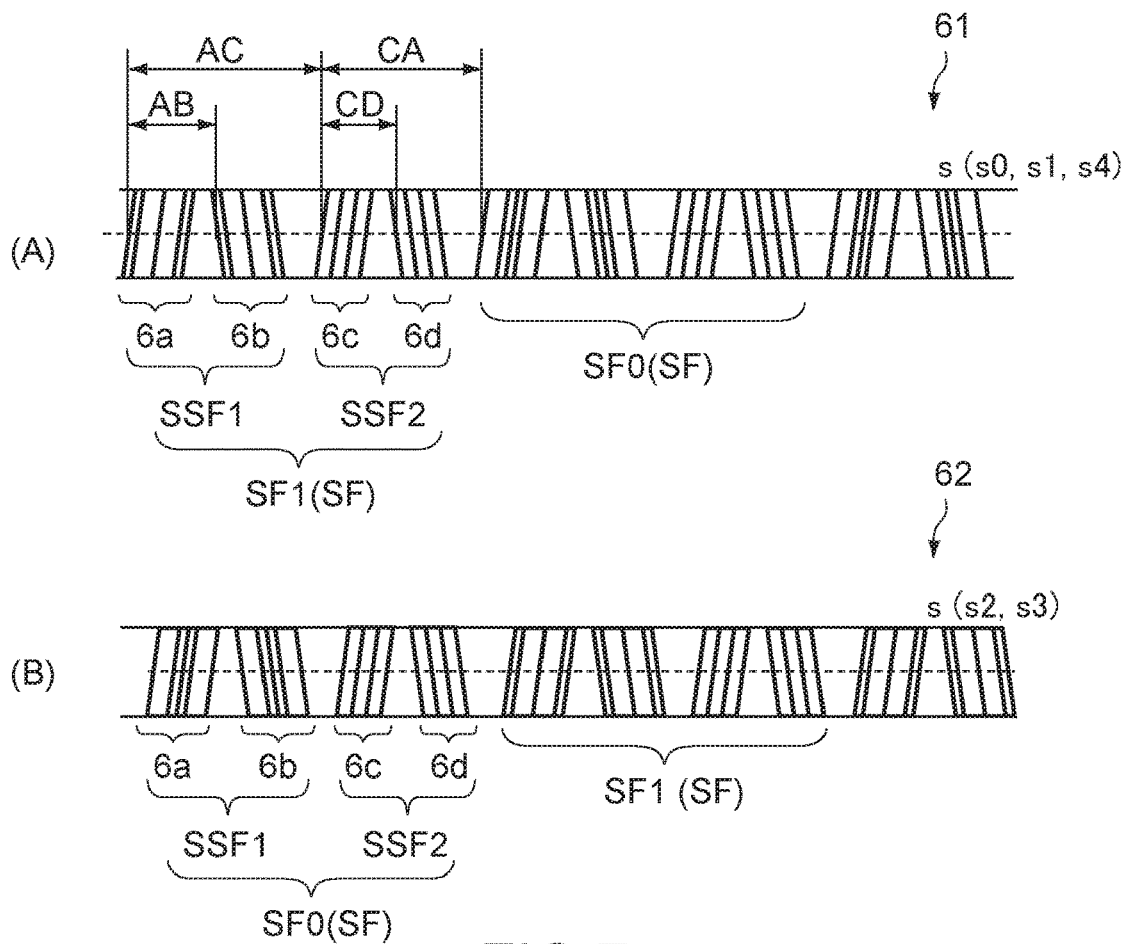
FIG. 7. A schematic diagram showing a configuration example of first servo band identification information and second servo band identification information.
Figure 8:
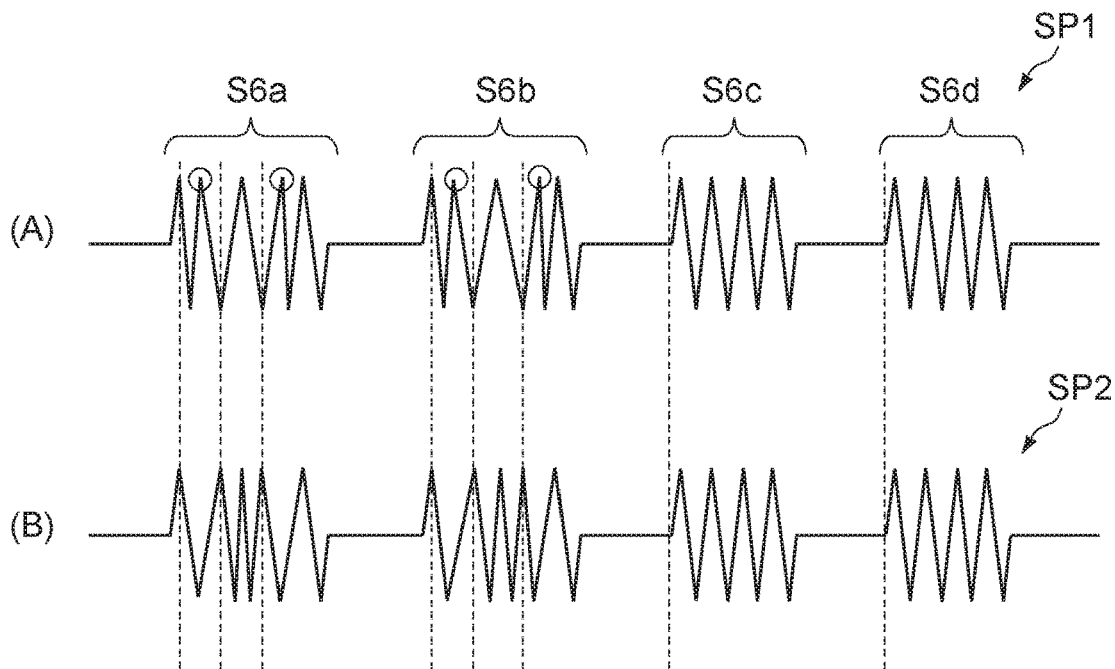
FIG. 8. A diagram showing reproduction waveforms of the first servo band identification information and the second servo band identification information.

The combination of the signs "0" and "1" that constitute the first and second servo band identification information is identified on the basis of the reproduction waveform of the servo pattern 6. That is, the reproduction waveform of the servo pattern 6 corresponds to modulated waves of the signs "0" and "1" and the first and second servo band identification information is read by demodulating the reproduction waveform and combining four bits, for example. Hereinafter, the first and second servo band identification information will be described with reference to FIGS. 7 and 8.

FIGS. 7(A) and (B) are schematic diagrams each showing a configuration example of a servo pattern (hereinafter, also referred to as first servo pattern 61) in which the first servo band identification information is embedded and a servo pattern (hereinafter, also referred to as second servo pattern 62) in which the second servo band identification information is embedded. As shown in the figure, the first servo pattern 61 and the second servo pattern 62 are both constituted by a combination of two types of servo frames SF including a servo frame SF1 that represents one sign (e.g., "1") and the servo frame SF0 that represents the other sign (e.g., "0"). The servo frames SF1 and SF0 are common in that each of the servo frames SF1 and SF0 includes the servo frame SF constituted by the first servo sub-frame SSF1 and the second servo sub-frame SSF2 as a constituent unit. However, the first servo sub-frames SSF1 (the A burst 6a and the B burst 6b) are different from each other. The first and second servo band identification information is constituted by, for example, four combinations of the first servo sub-frames SSF1 different from each other.

As shown in FIG. 7(A), when five tilt patterns that constitute each of the A burst 6a and the B burst 6b are set as a first tilting portion, a second tilting portion, a third tilting portion, a fourth tilting portion, and a fifth tilting portion in the stated order from the left-hand side of the figure in the servo frame SF1 indicating the sign "1", the second and fourth tilting portions are arranged at positions deviated toward the first and the fifth tilting portions, respectively. On the other hand, as shown in FIG. 7(B), in the servo frame SF0 indicating the sign "0", the arrangement intervals of some of the tilt patterns that constitute the A burst 6a and the B burst 6b are different from those of the servo frame SF1. In the shown example, regarding five tilt patterns that constitute each of the A burst 6a and the B burst 6b, the second and fourth tilting portions are arranged at positions deviated toward the third tilting portion, respectively. Therefore, regarding the A burst 6a and the B burst 6b in the servo frame SF0, the interval between the second tilting portion and the third tilting portion and the interval between the third tilting portion and the fourth tilting portion are shortest and the interval between the first tilting portion and the second tilting portion and the interval between the fourth tilting portion and the fifth tilting portion are longest.

FIGS. 8(A) and (B) show reproduction waveforms SP1 and SP2 of the first servo pattern 61 and the second servo pattern 62, respectively. The reproduction waveform of each of the servo frames SF1 and SF0 is constituted by a burst signal having a peak at a position corresponding to the tilting portion of each of the respective bursts 6a to 6d. As described above, regarding the servo frame SF0, the configurations of the A burst 6a and the B burst 6b are different from the A burst 6a and the B burst 6b of the servo frame SF1. Therefore, the peak positions of the burst signals S6a and S6b are deviated corresponding to the intervals of the different tilting portions. Therefore, information written in the servo frame SF can be read by detecting sites where this peak positions are deviated, the amount of deviation, and the direction of deviation. Here, for example, the servo frame SF1 shown in FIG. 8(A) indicates one bit "1" and the servo frame SF0 shown in FIG. 8(B) indicates another bit "0". The first and second servo band identification information can be configured by arbitrarily combining four bits of those two the servo frames SF1 and SF0, for example.

In the description above, the record positions of the second and fourth tilting portions of the A burst and the B burst 6b are made different, though not limited thereto. At least one of the A burst 6a, the B burst 6b, the C burst 6c, or the D burst 6d may be made different. The tilting portions that make the record positions different are also not limited to the second and fourth tilting portions. That is, if the arrangement intervals of at least some of two or more different types of azimuthal slopes that constitute the servo frames SF, a bit can be identified. For example, a bit sequence of 4 bits thereof only needs be different between the servo frame SF1 and the servo frame SF0.

The angles and arrangement intervals of the azimuthal slopes that constitute the servo frames SF1 and SF0 are not particularly limited and can be arbitrarily set in a manner that depends on the tape width, the number of servo bands, or the like. For example, the distances AB and AC can be set to 30 µm or more and 100 µm or less, the angle of inclination of each azimuthal slope with respect to the tape width direction can be set to 6° or more and 25° or less, and the length of each azimuthal slope in the tape width direction can be set to 30 µm or more and 192 µm or less.

The magnetic tape 1 according to this embodiment includes three first servo bands A in which the first servo band identification information is recorded and two second servo bands B in which the second servo band identification information is recorded. In the example of FIG. 3, the servo bands s0, s1, and s4 correspond to the first servo bands A and the servo bands s1 and s2 correspond to the second servo bands B. In this manner, the first servo bands A in which the first servo band identification information is to be recorded and the second servo bands B in which the second servo band identification information is to be recorded are set such that a combination of the first servo band identification information and the second servo band identification information is not duplex between the two adjacent servo bands.

Figure 9:
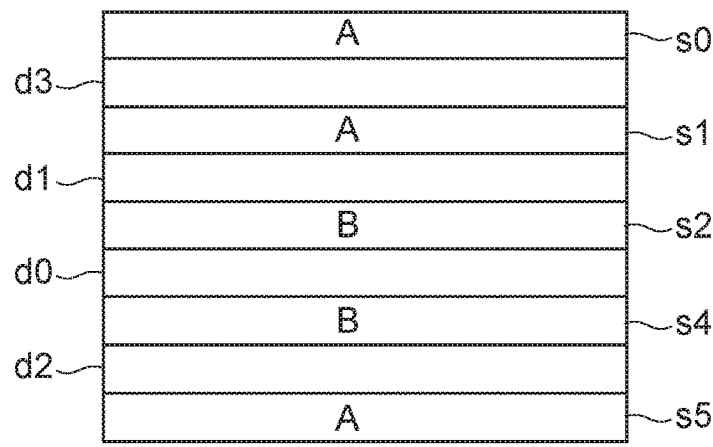
FIG. 9. A schematic view showing an allocation example of a servo band of 5 ch (channels).

FIG. 9 is a schematic view showing allocation of the servo bands A and B in the magnetic tape 1 of the servo band of 5 ch (channels) shown in FIG. 3. As shown in the figure, in a case where pairs of servo bands adjacent to each other are AA, AB, BB, and BA, they correspond to data bands d3, d1, d0, and d2, respectively.

Figure 10:
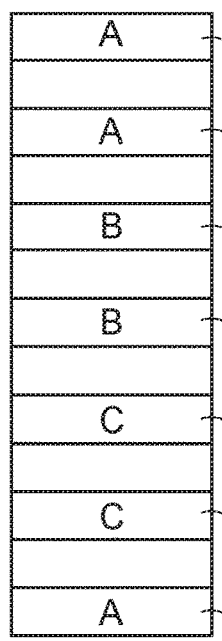
FIG. 10. A schematic view showing an allocation example of servo bands of 7 ch, 9 ch, and 11 ch.
Figure 10:
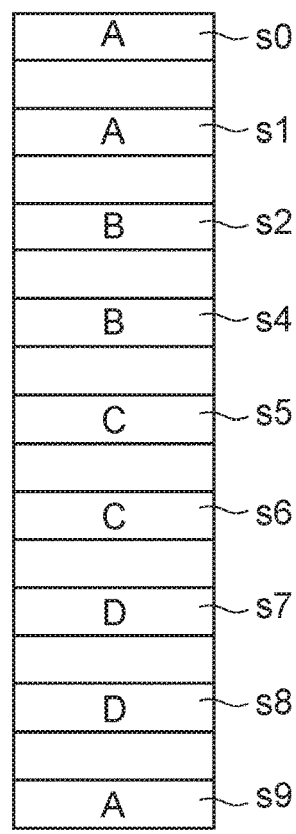
Figure 10:
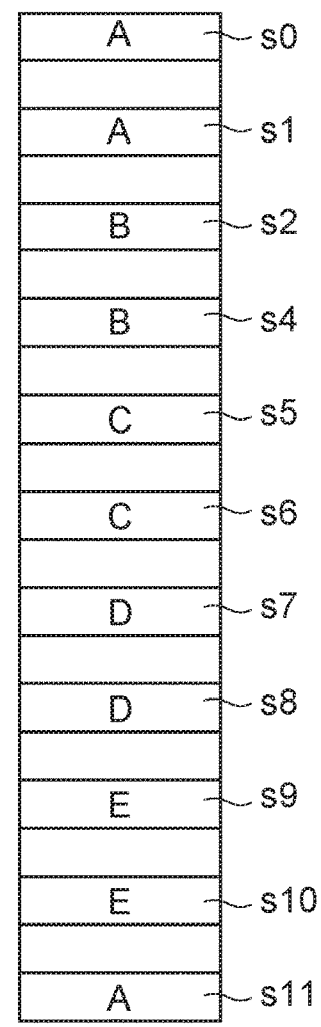

FIG. 10 is a schematic view similar to FIG. 9 in a case where the magnetic tape 1 includes servo bands of 7 ch, 9 ch, and 11 ch.

In the case of 7 ch, third servo bands C in which the servo band identification information different from that of those first and second servo bands A and B is to be recorded are provided as well as the first and second servo bands A and B. A third servo pattern including 4-bit information (e.g., "0110") different from the first and second servo band identification information is recorded as the third servo band identification information in the third servo bands C.

In the case of 9 ch, fourth servo bands D in which the servo band identification information different from that of those first to third servo bands A to C is to be recorded are provided as well as the first to third servo bands A to C. A fourth servo pattern including 4-bit information (e.g., "0101") different from the first, second, and third servo band identification information is recorded as the fourth servo band identification information in the fourth servo bands D.

Similarly, in the case of 11 ch, fifth servo bands E in which the servo band identification information different from those first to fourth servo bands A to D is to be recorded are provided as well as the first to fourth servo bands A to D. A fifth servo pattern including 4-bit information (e.g., "0100") different from the first, second, third, and fourth servo band identification information is recorded as the fifth servo band identification information in the fifth servo bands E.

The third to fifth servo band identification information can be arbitrarily set by making a combination of the servo frame SF1 and the servo frame SF0 different from those of the first and second servo band identification information.

The allocation example of the first to fifth servo bands A to E is not limited to the example shown in FIG. 10. For example, in a case of 7 ch, the servo bands may be arranged as AABBCCB, AABBACB, AABBCBA, or the like instead of arranging the servo bands as AABBCCA from above in the figure.

As it will be clear from the examples of FIGS. 9 and 10, in accordance with this embodiment, it is sufficient that the number of pieces of servo band identification information is a number ((number of servo bands)−1) fewer than half the number of servo bands: two in the case of 5 ch; three in the case of 7 ch; four in the case of 9 ch; and five in the case of 11 ch.

As described above, the magnetic tape 1 according to this embodiment includes three first servo bands A in which the first servo band identification information is recorded and two second servo bands in which the second servo band identification information is recorded. The data band is configured to be identified on the basis of a difference of the servo band identification information combination constituted by four bits of a pair of servo bands sandwiching the data band d, for example. Accordingly, an increase in servo band identification information due to an increase in number of data bands can be suppressed and an increase in number of data bands can be easily coped with.

Further, it is unnecessary to add specific servo band identification information to individual servo bands, and thus an increase in types of servo band identification information can be suppressed and allocation of the servo band identification information to each servo band can be easily performed.

[Details of Servo Pattern Recording Apparatus]

Subsequently, the details of the servo pattern recording apparatus 100 will be described.

Figure 11:
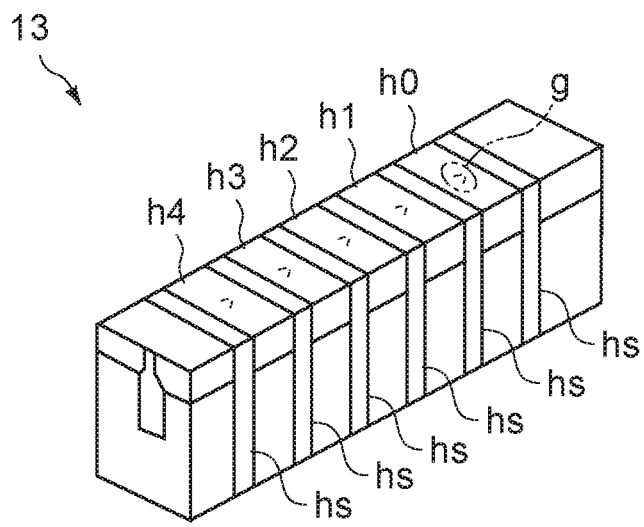
FIG. 11. A perspective view schematically showing a configuration of a servo write head in the servo pattern recording apparatus.
Figure 12:
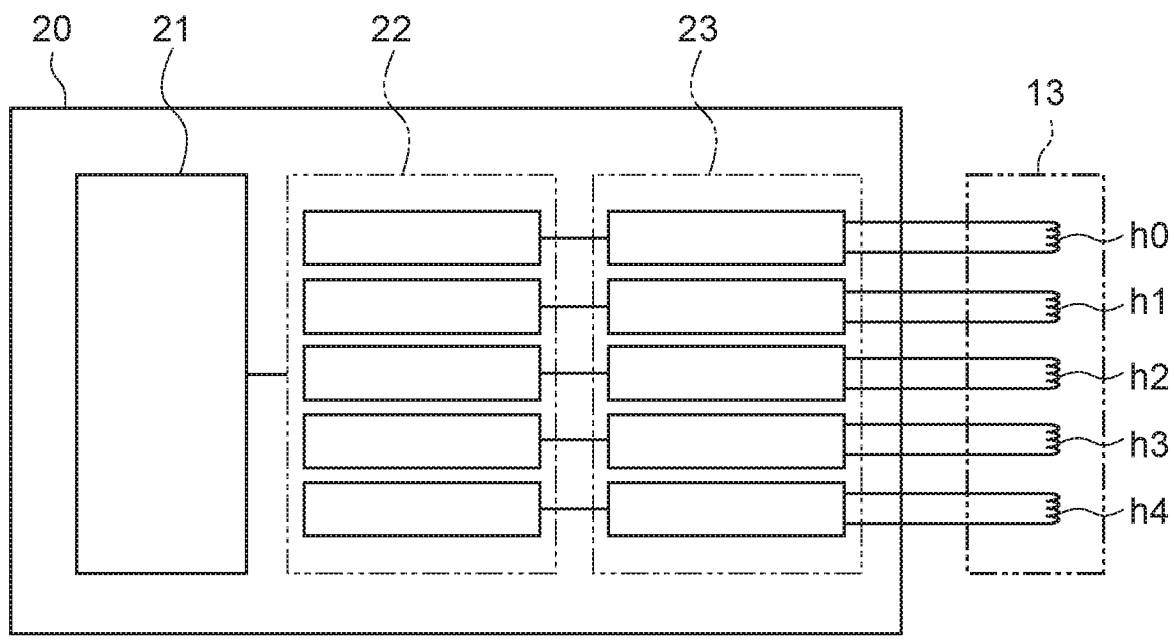
FIG. 12. A block diagram showing a configuration of a drive unit that drives the servo write head.

As shown in FIG. 1, the servo pattern recording apparatus 100 includes the drive unit 20 that drives the servo write head 13. FIG. 11 is a perspective view schematically showing a configuration of the servo write head 13. FIG. 12 is a block diagram showing a configuration of the drive unit 20.

As shown in FIG. 11, the servo write head 13 includes a plurality of head blocks h0 to h4 for recording the servo pattern 6 in each of the servo bands s0 to s4 of the magnetic tape 1. The respective head blocks h0 to h4 are joined with each other via an adhesive layer hs. The respective head blocks h0 to h4 constitute recording portions arranged corresponding to the respective servo bands s0 to s4 of the magnetic tape 1 and include magnetic gaps g for recording the servo pattern in each servo band.

The magnetic gaps g is constituted by a pair of straight line portions ("/" and "\") that tilt in opposite directions. One straight line portion "/" records the A burst 6a and the C burst 6c. The other straight line portion "\" records the B burst 6b and the D burst 6d. The magnetic gaps g of respective head blocks h1 to h5 are arranged, aligned on an axis parallel to the longitudinal direction of the servo write head 13. The respective head blocks h0 to h4 are magnetically separated from each other and are configured to be capable of recording different types of servo patterns in two or more servo bands at the same time.

On the basis of the output from the controller 30 (see FIG. 1), the drive unit 20 includes a converter 21 that converts the servo information into pulse information, signal generating units 22 that generate a pulse signal on the basis of the output of the converter 21, and amplifiers 23 that amplify the generated pulse signal. The plurality of signal generating units 22 and the plurality of amplifiers 23 are provided corresponding to each of the head blocks h0 to h4. The plurality of signal generating units 22 and the plurality of amplifiers 23 are configured to be capable of outputting a specific pulse signal to each of the head blocks h0 to h4.

The controller 30 includes a memory that stores data regarding the positions (in this example, s0, s1, and s4) of the servo bands in which the first servo band identification information is to be recorded and the positions (in this example, s2 and s3) of the servo bands in which the second servo band identification information is to be recorded. The controller 30 controls the drive unit 20 on the basis of the data stored in the memory.

The converter 21 individually outputs pieces of information corresponding to the servo band identification information to be recorded in the respective servo bands s0 to s4 to the signal generating units 22 corresponding to the respective head blocks h0 to h4. In this embodiment, a first pulse signal PS1 (the first recording signal) for recording the first servo pattern 61 (FIG. 7(A)) including the first servo band identification information in the head blocks h0, h1, and h4 corresponding to the servo bands s0, s1, and s4 is output and a second pulse signal PS2 (the second recording signal) for recording the second servo pattern 62 (FIG. 7(B)) including the second servo band identification information in the head blocks h2 and h3 corresponding to the servo bands s2 and s3 is output.

Figure 13:
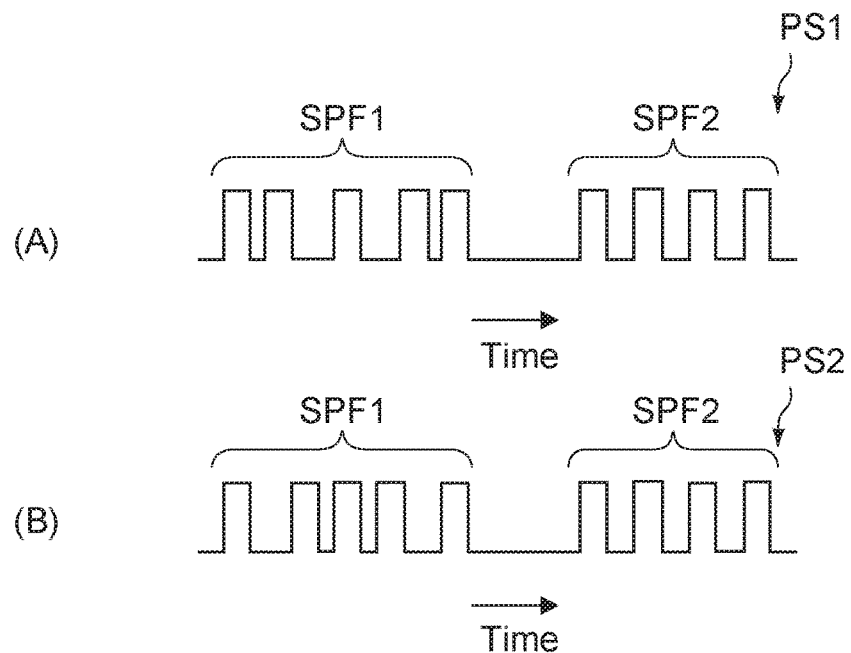
FIG. 13. A schematic view showing a part of waveforms of a first pulse signal and a second pulse signal input into the servo write head.

FIGS. 13(A) and (B) schematically show recording signal waveforms of the first servo sub-frames SSF1 in the first pulse signal PS1 and the second pulse signal PS2, respectively. As shown in the figure, the first and second pulse signals PS1 and PS2 each include a first pulse group SPF1 constituted by five pulse groups and a second pulse group SPF2 constituted by four pulse groups. The first pulse group SPF1 is a signal for recording the respective tilting portions of the A burst 6a. The second pulse group SPF2 is a signal for recording the respective tilting portions of the B burst 6b.

As shown in the figure, second and fourth pulse rise times in the first pulse group SPF1 are different between the first pulse signal PS1 and the second pulse signal PS2. The second pulse rise time of the pulse signal PS2 is later than that of the pulse signal PS1. Meanwhile, the second pulse rise time of the pulse signal PS2 is earlier than that of the pulse signal PS1. Accordingly, the first servo sub-frames SSF1 in which some of the arrangement intervals of the tilting portions of the A bursts 6a as shown in FIGS. 7(A) and (B) are different from each other are formed.

In addition, the first pulse signal PS1 and the second pulse signal PS2 are each transmitted to the head blocks h0 to h4 on the same phase (at an identical timing). Accordingly, each of the head blocks h0 to h4 records the first servo pattern 61 (the first servo band identification information) in the servo bands s0, s1, and s4 and the second servo pattern 62 (the second servo band identification information) in the servo bands s2 and s3 on the same phase.

Figure 14:
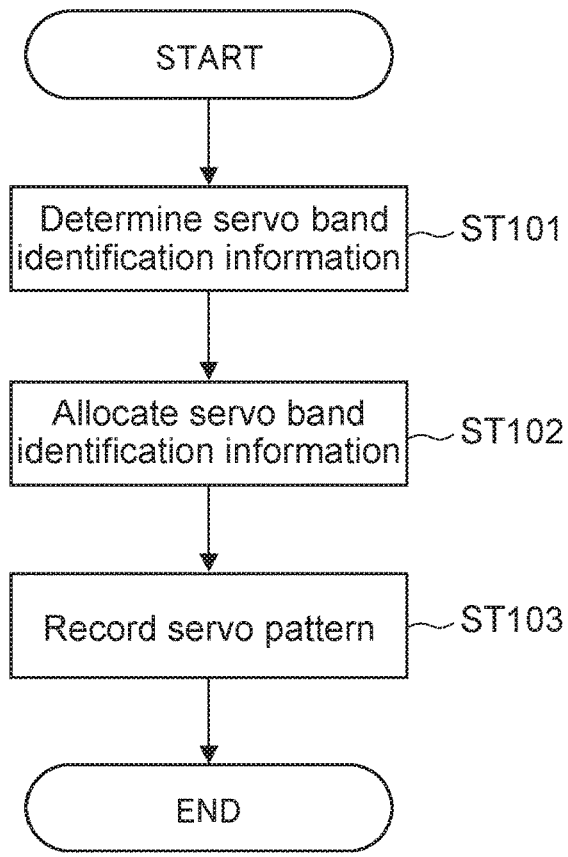
FIG. 14. A flowchart describing a servo pattern recording method according to the embodiment of the present technology.

FIG. 14 is a flowchart describing the above-mentioned servo pattern recording method.

First of all, servo patterns according to the number of servo bands (the number of channels) are determined (ST101). In this embodiment, servo patterns are recorded in the magnetic tape 1 including the servo bands s0 to s4 of 5 ch, and thus two types of servo patterns (the first servo pattern 61 and the second servo pattern 62) different from each other in servo band identification information are determined. The determined servo patterns are, for example, input via the input unit of the controller 30 and are stored in the above-mentioned memory.

It should be noted that three types of servo band identification information (e.g., "1001", "0111", and "0110") including servo bands different from each other in the case of 7 ch, for example, are determined, four types of servo band identification information (e.g., "1001", "0111", "0110", and "0101") including servo bands different from each other in the case of 9 ch, for example, are determined, and five types of servo band identification information (e.g., "1001", "0111", "0110", "0101", and "0100") including servo bands different from each other in the case of 11 ch, for example, are determined (see FIG. 10)

Subsequently, first servo bands A in which the first servo band identification information is recorded and second servo bands B in which the second servo band identification information is recorded are determined (ST102). In this embodiment, as described above, the servo bands s0, s1, and s4 are determined as the first servo bands A and the servo bands s2 and s3 are determined as the second servo bands B. The respective determined servo bands A and B are, for example, input via the input unit of the controller 30. It should be noted that in a case where the servo bands are 7 ch or more, the third to fifth servo bands C, D, and E are further determined in the form as shown in FIG. 10, for example.

Subsequently, the drive unit 20 inputs the first and second pulse signals PS1 and PS2 into the servo write head 13. In this manner, the first servo pattern 61 including the first servo band identification information and the second servo pattern 62 including the second servo band identification information are recorded in the first servo bands A and the second servo bands B on the same phase (ST103). Accordingly, the magnetic tape 1 shown in FIG. 3 is fabricated.

As described above, in accordance with this embodiment, the servo patterns 6 to be recorded in the respective servo bands s0 to s4 are respectively arranged on the same phase, and thus the servo patterns 6 on the respective servo bands s0 to s4 can be detected with high accuracy without being affected by the phase differences of the PESs. Accordingly, an increase in number of servo bands due to the increase in number of data bands can also be sufficiently coped with.

Moreover, in accordance with this embodiment, the plurality of types of servo frames SF1 and SF0 is formed by making the arrangement intervals of some of the tilting portions in the servo sub-frame SSF1 different. Therefore, the servo band identification information corresponding to each servo band can be suitably acquired without interfering with tracking control.

Moreover, in accordance with this embodiment, the number of types of servo band identification information can be set to the number fewer than half the number of servo bands. Therefore, simplification of recorded information can be achieved. Accordingly, the amount of usage of the memory that is necessary for writing and reading information regarding the servo bands can be reduced.

Modified Example

In the above-mentioned embodiment, the two types of azimuthal slopes "/" and "Y" of the servo frames SF that constitute the servo pattern 6 are employed. Alternatively, the servo pattern may further include azimuthal slopes having angles of inclination different from them.

Further, in the above-mentioned embodiment, the magnetic tape according to the LTO standard has been exemplified as the tape-like magnetic recording medium. Alternatively, the present technology can also be applied to a magnetic tape according to another standard.

It should be noted that the present technology may also take the following configurations.

(1) A servo pattern recording method of recording a servo pattern on a tape-like magnetic recording medium including a magnetic layer including five or more servo bands, the method including:
   determining
      at least three first servo bands in which first servo band identification information constituted by a plurality of bits is to be recorded, and
      at least two second servo bands in which second servo band identification information constituted by a plurality of bits is to be recorded, the second servo band identification being different from the first servo band identification information; and
   recording each of the first servo band identification information and the second servo band identification information in the first servo band and the second servo band on the same phase.

(2) The servo pattern recording method according to (1), in which
   the first servo band and the second servo band are determined such that a combination of the first servo band identification information and the second servo band identification information is not duplex between two adjacent servo bands.

(3) The servo pattern recording method according to (1) or (2), further including
   determining a third servo band in which third servo band identification information constituted by a plurality of bits is to be recorded, the third servo band identification information being different from the first servo band identification information and the second servo band identification information.

(4) The servo pattern recording method according to any one of (1) to (4), in which
   the first servo band identification information includes a plurality of servo frames that includes two or more different types of azimuthal slopes and encodes the first servo band identification information,
   the second servo band identification information includes a plurality of servo frames that includes two or more different types of azimuthal slopes and encodes the second servo band identification information, and
   as the plurality of servo frames that encodes the first servo band identification information and the servo frames that encode the second servo band identification information are compared to each other, some of arrangement intervals of at least one azimuthal slopes are different from each other.

(5) A servo pattern recording apparatus that records a servo pattern on a tape-like magnetic recording medium including a magnetic layer including five or more servo bands, the apparatus including:
   a servo write head including a plurality of recording portions arranged corresponding to the servo bands; and
   a drive unit that
      outputs a first recording signal for recording the first servo band identification information with respect to a first recording portion corresponding to at least three first servo bands in which first servo band identification information constituted by a plurality of bits is to be recorded, and
      outputs a second recording signal for recording the second servo band identification information on the same phase as the first servo band identification information with respect to the second recording portion corresponding to at least two second servo bands in which second servo band identification information constituted by a plurality of bits is to be recorded, the second servo band identification being different from the first servo band identification information.

(6) The servo pattern recording apparatus according to (5), in which
   the servo write head records the first servo band identification information and the second servo band identification information in the servo bands such that a combination of the first servo band identification information and the second servo band identification information is not duplex between two adjacent servo bands.

(7) The servo pattern recording apparatus according to (5) or (6), in which
   the plurality of recording portions respectively includes magnetic gaps in which a plurality of servo frames that includes two or more different types of azimuthal slopes in the servo bands and encodes the first servo band identification information and the second servo band identification information is capable of being recorded as each of the first servo band identification information and the second servo band identification information, and
   the drive unit outputs the first recording signal and the second recording signal at pulse rise times different from each other in accordance with a difference between the first servo band identification information and the second servo band identification information.

(8) A manufacturing method for a tape-like magnetic recording medium including a magnetic layer including five or more servo bands, the method including:
   determining
      at least three first servo bands in which first servo band identification information constituted by a plurality of bits is to be recorded, and
      at least two second servo bands in which second servo band identification information constituted by a plurality of bits is to be recorded, the second servo band identification being different from the first servo band identification information; and
   recording each of the first servo band identification information and the second servo band identification information on the same phase in the first servo band and the second servo band.

(9) A tape-like recording medium, including
   a magnetic layer including five or more servo bands, in which
   the servo bands include
      at least three first servo bands in which first servo band identification information constituted by a plurality of bits is recorded, and
      at least two second servo bands in which second servo band identification information constituted by a plurality of bits is recorded, the second servo band identification information being different from the first servo band identification information.

(10) The tape-like recording medium according to (9), in which
   the first servo band identification information and the second servo band identification information are recorded on the same phase.

(11) The tape-like recording medium according to (9) or (10), in which
   the first servo band identification information and the second servo band identification information are recorded in the servo bands such that a combination of the first servo band identification information and the second servo band identification information is not duplex between two adjacent servo bands.

(12) The tape-like recording medium according to any one of (9) to (11), in which
the first servo band identification information includes a plurality of servo frames that includes two or more different types of azimuthal slopes and encodes the first servo band identification information,
the second servo band identification information includes a plurality of servo frames that includes two or more different types of azimuthal slopes and encodes the second identification information, and
as the plurality of servo frames that encodes the first servo band identification information and the servo frames that encode the second servo band identification information are compared to each other, some of arrangement intervals of at least one azimuthal slopes are different from each other.

(13) The tape-like recording medium according to any one of (9) to (12), in which
the servo bands further include a third servo band in which third servo band identification information constituted by a plurality of bits is recorded, the third servo band identification information being different from the first servo band identification information and the second servo band identification information.

REFERENCE SIGNS LIST 1 magnetic tape
4 magnetic layer
6 servo pattern
13 servo write head
20 drive unit
30 controller
61 first servo pattern
62 second servo pattern
100 servo pattern recording apparatus
d0 to d3 data band
s0 to s4 servo band
SF, SF1, SF0 servo frame

The invention claimed is:

1. A servo pattern recording method of recording a servo pattern on a tape-like magnetic recording medium including a magnetic layer including five or more servo bands, the method comprising:
determining
at least three first servo bands in which first servo band identification information constituted by a plurality of bits is to be recorded, and
at least two second servo bands in which second servo band identification information constituted by a plurality of bits is to be recorded, the second servo band identification being different from the first servo band identification information; and
recording each of the first servo band identification information and the second servo band identification information in the first servo band and the second servo band on a same phase.

2. The servo pattern recording method according to claim 1, wherein
the first servo band and the second servo band are determined such that a combination of the first servo band identification information and the second servo band identification information is not duplex between two adjacent servo bands.

3. The servo pattern recording method according to claim 1, further comprising
determining a third servo band in which third servo band identification information constituted by a plurality of bits is to be recorded, the third servo band identification information being different from the first servo band identification information and the second servo band identification information.

4. The servo pattern recording method according to claim 1, wherein
the first servo band identification information includes a plurality of servo frames that includes two or more different types of azimuthal slopes and encodes the first servo band identification information,
the second servo band identification information includes a plurality of servo frames that includes two or more different types of azimuthal slopes and encodes the second servo band identification information, and
as the plurality of servo frames that encodes the first servo band identification information and the servo frames that encode the second servo band identification information are compared to each other, some of arrangement intervals of at least one azimuthal slopes are different from each other.

5. A servo pattern recording apparatus that records a servo pattern on a tape-like magnetic recording medium including a magnetic layer including five or more servo bands, the apparatus comprising:
a servo write head including a plurality of recording portions arranged corresponding to the servo bands; and
a drive unit that
outputs a first recording signal for recording the first servo band identification information with respect to a first recording portion corresponding to at least three first servo bands in which first servo band identification information constituted by a plurality of bits is to be recorded, and
outputs a second recording signal for recording the second servo band identification information on a same phase as the first servo band identification information with respect to the second recording portion corresponding to at least two second servo bands in which second servo band identification information constituted by a plurality of bits is to be recorded, the second servo band identification being different from the first servo band identification information.

6. The servo pattern recording apparatus according to claim 5, wherein
the servo write head records the first servo band identification information and the second servo band identification information in the servo bands such that a combination of the first servo band identification information and the second servo band identification information is not duplex between two adjacent servo bands.

7. The servo pattern recording apparatus according to claim 5, wherein
the plurality of recording portions respectively includes magnetic gaps in which a plurality of servo frames that includes two or more different types of azimuthal slopes in the servo bands and encodes the first servo band identification information and the second servo band identification information is capable of being recorded as each of the first servo band identification information and the second servo band identification information, and the drive unit outputs the first recording signal and the second recording signal at pulse rise times different from each other in accordance with a difference between the first servo band identification information and the second servo band identification information.

8. A manufacturing method for a tape-like magnetic recording medium including a magnetic layer including five or more servo bands, the method comprising:
determining
at least three first servo bands in which first servo band identification information constituted by a plurality of bits is to be recorded, and
at least two second servo bands in which second servo band identification information constituted by a plurality of bits is to be recorded, the second servo band identification being different from the first servo band identification information; and
recording each of the first servo band identification information and the second servo band identification information on a same phase in the first servo band and the second servo band.

9. A tape-like magnetic recording medium, comprising
a magnetic layer including five or more servo bands, wherein
the servo bands include
at least three first servo bands in which first servo band identification information constituted by a plurality of bits is recorded, and
at least two second servo bands in which second servo band identification information constituted by a plurality of bits is recorded, the second servo band identification information being different from the first servo band identification information,
wherein the first servo band identification information and the second servo band identification information are recorded on a same phase.

10. The tape-like magnetic recording medium according to claim 9, wherein
the first servo band identification information and the second servo band identification information are recorded in the servo bands such that a combination of the first servo band identification information and the second servo band identification information is not duplex between two adjacent servo bands.

11. The tape-like magnetic recording medium according to claim 9, wherein
the first servo band identification information includes a plurality of servo frames that includes two or more different types of azimuthal slopes and encodes the first servo band identification information,
the second servo band identification information includes a plurality of servo frames that includes two or more different types of azimuthal slopes and encodes the second servo band identification information, and
as the plurality of servo frames that encodes the first servo band identification information and the servo frames that encode the second servo band identification information are compared to each other, some of arrangement intervals of at least one azimuthal slopes are different from each other.

12. The tape-like magnetic recording medium according to claim 9, wherein
the servo bands further include a third servo band in which third servo band identification information constituted by a plurality of bits is recorded, the third servo band identification information being different from the first servo band identification information and the second servo band identification information.

13. The tape-like magnetic recording medium according to claim 9, further comprising:
a base material;
an underlayer provided between one main surface of the base material and the magnetic layer; and
a back layer provided on another main surface of the base material.

14. The tape-like magnetic recording medium according to claim 13, wherein:
the base material includes polyethylene terephthalate (PET) or polyethylene naphthalate (PEN).

15. The tape-like magnetic recording medium according to claim 13, wherein:
the base material has an average thickness of 4.2 µm or less.

16. The tape-like magnetic recording medium according to claim 13, wherein:
the base material has an average thickness of 3.8 µm or less.

17. The tape-like magnetic recording medium according to claim 13, wherein:
the base material has an average thickness of 3.4 µm or less.

18. The tape-like magnetic recording medium according to claim 13, wherein:
the magnetic layer has an average thickness of 80 nm or less.

19. The tape-like magnetic recording medium according to claim 13, wherein:
the magnetic layer has an average thickness of 70 nm or less.

20. The tape-like magnetic recording medium according to claim 13, wherein:
the magnetic layer has an average thickness of 50 nm or less.

21. The tape-like magnetic recording medium according to claim 13, wherein:
the underlayer has an average thickness of 0.3 µm or more and 2.0 µm or less.

22. The tape-like magnetic recording medium according to claim 13, wherein:
the underlayer has an average thickness of 0.5 µm or more and 1.4 µm or less.

23. The tape-like magnetic recording medium according to claim 13, wherein:
the back layer has an average thickness of 0.6 µm or less.

* * * * *